(12) United States Patent
Honmatsu et al.

(10) Patent No.: US 8,013,262 B2
(45) Date of Patent: Sep. 6, 2011

(54) KEY SHEET

(75) Inventors: Yoshifumi Honmatsu, Tokyo (JP); Yasunori Takeda, Tokyo (JP); Yutaka Nakanishi, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 234 days.

(21) Appl. No.: 12/365,301

(22) Filed: Feb. 4, 2009

(65) Prior Publication Data

US 2009/0200148 A1 Aug. 13, 2009

(30) Foreign Application Priority Data

Feb. 8, 2008 (JP) ................... 2008-028392

(51) Int. Cl.
*H01H 13/70* (2006.01)
*H01H 9/00* (2006.01)

(52) U.S. Cl. ......... 200/5 A; 200/512; 200/600; 345/173; 341/22

(58) Field of Classification Search .................. 200/5 A, 200/600, 512, 517, 341, 310, 313, 314, 317; 341/22, 33, 34; 345/168, 169, 173; 455/556.1, 455/556.2, 575.7, 575.8, 90; 178/18.01
See application file for complete search history.

(56) References Cited

U.S. PATENT DOCUMENTS

| | | | |
|---|---|---|---|
| 6,518,958 B1 * | 2/2003 | Miyajima et al. ............. | 345/173 |
| 6,704,005 B2 * | 3/2004 | Kato et al. .................... | 345/173 |
| 7,348,898 B2 * | 3/2008 | Ono ............................... | 341/33 |
| 7,589,713 B2 * | 9/2009 | Sato ............................... | 345/169 |
| 7,656,314 B2 * | 2/2010 | Muranaka et al. .............. | 341/22 |
| 7,829,812 B2 * | 11/2010 | Tolbert et al. ................. | 200/600 |
| 2002/0049070 A1 * | 4/2002 | Bick .............................. | 455/550 |
| 2003/0025679 A1 * | 2/2003 | Taylor et al. .................. | 345/175 |
| 2005/0030048 A1 * | 2/2005 | Bolender et al. ............. | 324/661 |

FOREIGN PATENT DOCUMENTS

JP 2002196856 7/2002

* cited by examiner

*Primary Examiner* — Michael Friedhofer
(74) *Attorney, Agent, or Firm* — Cermak Nakajima LLP; Tomoko Nakajima

(57) ABSTRACT

Provided is a key sheet allowing reliable sliding operation input through accurate coordinate position detection and depressing operation input of satisfactory depression operability through clear click feel. Fixation layers are formed at positions under depressing operation portions, and there are no fixation layers in portions around the depressing operation portions but gaps are formed. With this construction, it is possible to suppress a depression operation load to a low level at a time of depressing input operation, and, when contact switches with click feel are depressed, the click feel can be easily transmitted. Further, a surface sheet has movable contact portions which enter the gaps at a time of sliding input operation and which are displaced so as to be capable of coming into contact with a sensor sheet. With this construction, it is possible to sense, in a stable manner, capacitance at an in-plane position of a sliding operation surface of the sensor sheet.

17 Claims, 13 Drawing Sheets

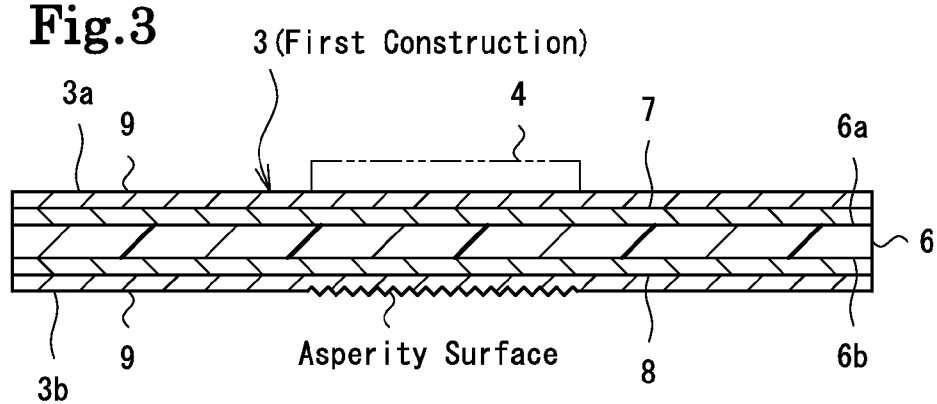
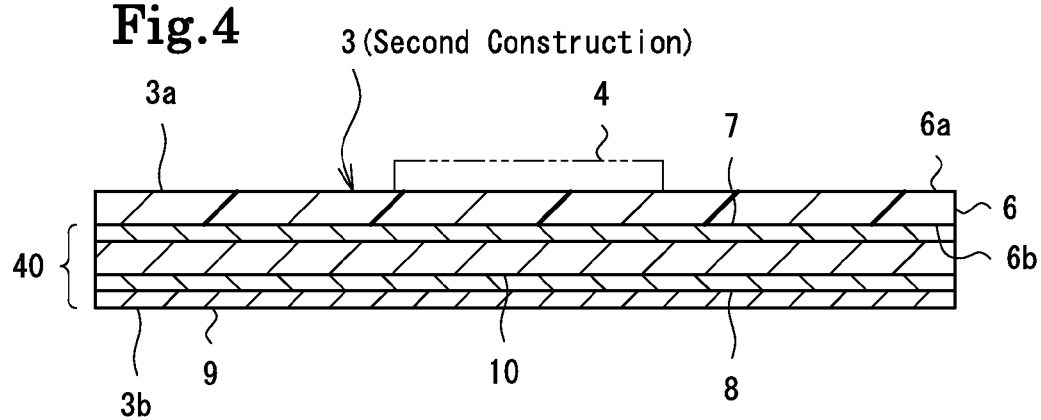
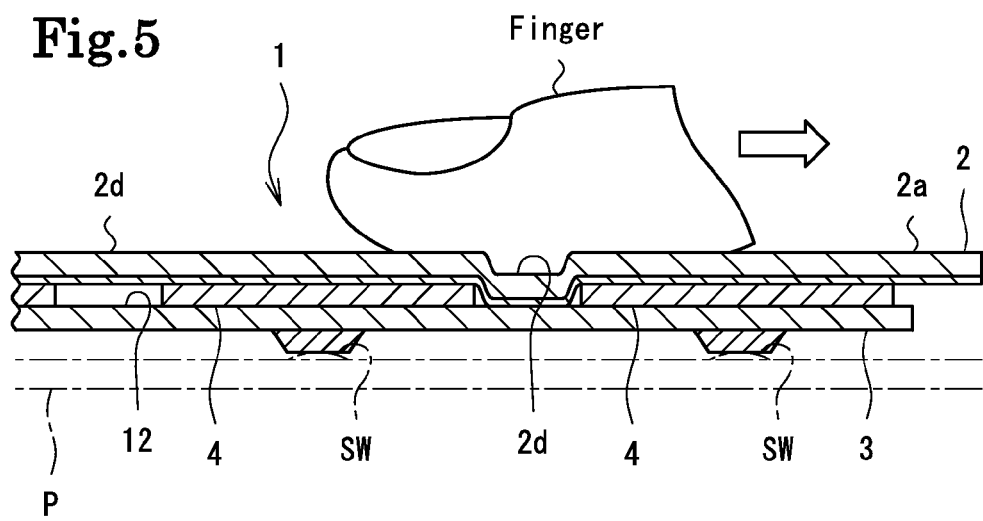

KEY SHEET

This application claims priority under 35 U.S.C. §119 to Japanese application 2008-028392 filed on Feb. 8, 2008. This document is incorporated in its entirety by reference.

BACKGROUND OF THE INVENTION

1. Field of the Invention

The present invention relates to a key sheet for pushbutton switches to be used in the operating portions of various portable electronic apparatuses such as a mobile phone, a personal digital assistant (PDA), and a notebook PC. In particular, the present invention relates to a key sheet having pushbuttons (key tops) to be depressed to effect input and a coordinate sensor for detecting the movement path of a finger when effecting input by stroking the surfaces of the pushbuttons with the finger.

2. Description of the Related Art

As components of the input operating portion of an electronic apparatus such as a mobile phone or a PDA, there are known a plurality of key tops to be depressed with a finger of the operator to effect input, and a coordinate sensor for detecting the movement path of the finger with which the operation surface formed by the top surfaces of the key tops is stroked to effect manual input. For example, JP 2002-196856 A discloses a key pad in which there are arranged a key mat provided with key tops convex on the front surface side and a capacitance sensing plate as a coordinate sensor provided on the back surface side of the key mat. Through depression of the key tops, this key pad allows depressing operation input like pushbutton switches; by stroking the operation surface formed by the top surfaces of a plurality of key tops with a finger, it is possible to effect sliding operation input like a touch pad.

In the coordinate sensor as disclosed in JP 2002-196856 A, the movement path of the finger is sensed from a change in capacitance at a coordinate position and converted to input data, making it possible to detect the coordinate position if sliding operation input is effected through an intermediation of a thin cover or thin key tops without directly touching the sensor. However, the requisite depression load at the time of depressing operation input is rather high, and hence it is rather hard for the click feel to be transmitted, resulting in a rather poor depression operability.

SUMMARY OF THE INVENTION

The present invention has been made in view of the above problem in the related art. It is accordingly an object of the present invention to provide a key sheet allowing reliable sliding operation input through accurate coordinate position detection and depressing operation input of satisfactory depression operability through clear click feel.

To achieve the above object, the present invention provides the following constructions:

(1) According to a first aspect of the present invention, there is provided a key sheet, which includes:

an operation member having a plurality of depressing operation portions on a sliding operation surface on which a user performs sliding input operation; and a sensor sheet for sensing the sliding input operation of the user as a change in capacitance, further including a fixation layer provided below the plurality of depressing operation portions and existing between the operation member and the sensor sheet to form a laminate structure devoid of a gap in a direction perpendicular to a plane of the sliding operation surface, in which the operation member has, at adjacent positions between the depressing operation portions, a movable contact portion which enters a gap devoid of a fixation layer between the operation member and the sensor sheet through sliding operation of the user and which is displaced so as to be capable of coming into contact with the sensor sheet.

According to the first aspect of the present invention, the fixation layer by means of which the operation member and the sensor sheet are fixed to each other is provided below each depressing operation portion. When, as in the related art, the entire opposing surfaces of the operation member and the sensor sheet are fixed by means of an adhesion layer, it is necessary, at the time of depressing operation, to apply a load large enough to deflect the operation member, the adhesion layer, and the sensor sheet, which are fixed to each other over the entire surfaces, resulting in a rather high depression load, which makes the depressing operation difficult to perform. Further, when such a high depression load is required, it is rather difficult for click feel to be transmitted when a contact switch with click feel is depressed, resulting in a rather poor depression operability.

In contrast, according to the first aspect of the present invention, a fixation layer is formed for the portion under each depressing operation portion, and there is no fixation layer for the other portion, and a gap is formed there instead, and hence it is possible to suppress the depressing operation load to a low level. Further, when the contact switch with click feel is depressed, the click feel can be easily transmitted, making it possible to realize a depressing operation input of satisfactory depression operability through clear click feel.

When sensing capacitance during sliding input operation, if there exists a gap (air layer) between the operation member with the sliding operation surface and the sensor sheet, there may be involved variation in the sensing of the capacitance by the corresponding portion of the sensor sheet. According to the first aspect of the present invention, the fixation layer is under each depressing operation portion of the operation member, thus forming a laminate structure with no gap. With this construction, the sensing of capacitance can be effected with high sensitivity, whereas there is no fixation layer under the portion corresponding to the interval between the depressing operation portions, thus forming a gap to thereby reduce the depression load when depressing operation is performed. However, at the adjacent position between the depressing operation portions of the operation member, there is provided a movable contact portion which enters the gap at the time of sliding input operation and which is displaced so as to be capable of coming into contact with the sensor sheet. Thus, at the time of sliding input operation, it is possible to eliminate the gap between the operation member and the sensor sheet, making it possible to sense capacitance in a stable manner at an in-plane position of the sliding operation surface of the sensor sheet. Thus, it is possible to realize a reliable sliding operation input through accurate coordinate position detection.

(2) In the key sheet according to the first aspect of the present invention, the operation member is provided with key tops as the plurality of depressing operation portions and a flexible base sheet for supporting the key tops so as to allow depression displacement in the direction perpendicular to the plane, and the movable contact portion of the operation member is a non-fixation portion for the key tops of the base sheet.

In this construction, each depressing operation portion forms a three-dimensional key top, and hence each depressing operation portion of the sliding operation surface allows easy transmission through the finger feel for each key top, making it possible to realize a sliding operation surface in which each depressing operation portion can be easily distinguished. Thus, it is possible to realize a key sheet of satisfactory depression operability.

Regarding the key sheet according to the first aspect of the present invention, it is possible for the fixation area of the fixation layer with respect to the operation member and the sensor sheet to be 25% to 100% with respect to the area of the depressing operation portion.

In this construction, it is possible to increase the deflected portion of the sensor sheet at the time of depressing operation, making it possible to reduce the requisite depression load. Thus, when the contact switch with click feel is depressed, the click feel can be easily transmitted, making it possible to realize satisfactory depression operability through clear click feel. When the fixation area of the fixation layer with respect to the operation member and the sensor sheet is less than 25% with respect to the depressing operation portion, the fixation strength between the operation member and the sensor sheet is rather weak, and there is a risk of the two components being subject to separation from each other. When the fixation area exceeds 100%, the portion of the fixation layer between the depressing operation portions of the sensor sheet constrains the sensor sheet so that the sensor sheet is not easily deformed, and there is a fear of an increase in depression load.

More specifically, the key sheet of the construction of the first aspect may be embodied in the following modes:

(3) In a first mode of the first aspect,
the operation member is provided with
key tops as the plurality of depressing operation portions arranged adjacent to each other at small intervals and
a flexible base sheet for supporting the key tops so as to allow depression displacement in the direction perpendicular to the plane,
the movable contact portion of the operation member is a non-fixation portion for the key tops of the base sheet, and
the non-fixation portion enters the gap upon depression of an outer periphery of the key tops at a time of sliding input operation by the user and is displaced so as to be capable of coming into contact with the sensor sheet.

In this construction, it is possible to realize satisfactory depressing operation input and reliable sliding operation input in a key sheet in which the key tops are arranged at small intervals.

(4) In a second mode of the first aspect,
the operation member is provided with
key tops as the plurality of depressing operation portions,
a flexible base sheet supporting the key tops so as to allow depression displacement in the direction perpendicular to the plane, and
a decoration member fixed to the base sheet so as to divide the key tops from each other,
the movable contact portion of the operation member is a fixation surface portion for the decoration member of the base sheet, and
the fixation surface portion enters the gap upon depression of the decoration member at a time of sliding input operation by the user and is displaced so as to be capable of coming into contact with the sensor sheet.

In this construction, it is possible to realize satisfactory depressing operation input and reliable sliding operation input in a key sheet provided with a decoration member allowing the same decoration as that for the key tops.

(5) In the key sheet according to the second mode of the first aspect, a top surface of the decoration member protrudes beyond top surfaces of the key tops.

In this construction, the decoration member can easily sink toward the sensor sheet, making it easier for the movable contact portion to enter the gap under the decoration member at the time of sliding input operation. Thus, it is possible to eliminate the gap between the operation member and the sensor sheet at the time of sliding input operation, making it possible to accurately sense the capacitance of the sensor sheet.

(6) In a third mode of the first aspect,
the operation member is provided with a flexible film key sheet having display portions exhibiting characters, numbers, or the like for input operation as the plurality of depressing operation portions,
the movable contact portion of the operation member is an adjacent portion between the display portions of the film key sheet, and
the adjacent portion enters the gap upon depression at a time of sliding input operation by the user and is displaced so as to be capable of coming into contact with the sensor sheet.

In this construction, it is possible to realize satisfactory depressing operation input and reliable sliding operation input in a key sheet having a sliding operation surface formed by a film key sheet.

(7) According to a second aspect of the present invention, there is provided a key sheet, which includes:
an operation member having a plurality of depressing operation portions on a sliding operation surface on which a user performs sliding input operation; and
a sensor sheet for sensing the sliding input operation of the user as a change in capacitance,
further including a fixation layer provided below the plurality of adjacent depressing operation portions and existing between the operation member and the sensor sheet to form a laminate structure devoid of a gap in a direction perpendicular to a plane of the sliding operation surface,
in which the operation member has, at positions corresponding to the plurality of depressing operation portions, a movable contact portion which enters a gap devoid of the fixation layer between the operation member and the sensor sheet through sliding operation of the user and which is displaced so as to be capable of coming into contact with the sensor sheet.

According to the second aspect of the present invention, the fixation layer for fixing the operation member and the sensor sheet to each other is provided at the position under the interval between the adjacent depressing operation portions. In this way, the fixation layer is formed at the portions of the opposing surfaces of the operation member and the sensor sheet corresponding to the interval between the adjacent depressing operation portions, and there is no fixation layer under each depressing operation portion, and a gap is formed, and hence it is possible to suppress the requisite depression load to a low level. Further, when the contact switch with click feel is depressed, the click feel can be easily transmitted, making it possible to realize a depressing operation input of satisfactory depression operability through a clear click feel.

Further, according to the second aspect of the present invention, there is provided the fixation layer at the position under the interval between the adjacent depressing operation portions, thus forming a laminate structure with no gap. With this structure, it is possible to sense capacitance with high sensitivity, whereas, under each depressing operation portion, there is no fixation layer, and a gap is formed to thereby reduce the depression load when depressing operation is performed. However, at the position of the operation member corresponding to each depressing operation portion, there is provided a movable contact portion which enters the gap at the time of sliding input operation and which is displaced so as to be capable of coming into contact with the sensor sheet. Thus, it is possible to eliminate the gap between the operation member and the sensor sheet at the time of sliding input operation, making it possible to effect in a stable manner the sensing of the capacitance at the in-plane position of the sliding operation surface of the sensor sheet. Thus, it is possible to realize reliable sliding operation input through accurate coordinate position detection.

(8) In the key sheet according to the second aspect of the present invention,
the operation member is provided with
key tops as the plurality of depressing operation portions and
a flexible base sheet for supporting the key tops so as to allow depression displacement in the direction perpendicular to the plane, and
the movable contact portion of the operation member is a fixation surface portion for the key tops of the base sheet.

In this construction, each depressing operation portion forms a key of a three-dimensional configuration, and hence each depressing operation portion of the sliding operation surface easily allows transmission for each key top through the feel of the finger, making it possible to realize a sliding operation surface in which each depressing operation portion can be easily distinguished. Thus, it is possible to realize a key sheet of satisfactory depression operability.

More specifically, the key sheet of the construction of the second aspect may be embodied in the following modes:

(9) In a first mode of the second aspect,
the operation member is provided with
key tops as the plurality of depressing operation portions arranged adjacent to each other at small intervals and
a flexible base sheet for supporting the key tops so as to allow depression displacement in the direction perpendicular to the plane,
the movable contact portion of the operation member is a fixation surface portion for the key tops of the base sheet, and
the fixation surface portion enters the gap devoid of the fixation layers between the operation member and the sensor sheet through sliding input operation by the user and is displaced so as to be capable of coming into contact with the sensor sheet.

In this construction, it is possible to realize satisfactory depressing operation input and reliable sliding operation input in a key sheet in which the key tops are arranged at small intervals.

(10) In the key sheet according to the first mode of the second aspect,
cutout-like step portions are provided in an outer periphery of bottom surfaces of the key tops, and
the step portions are displaced so as to be capable of coming into contact with the adjacent portions between the key tops of the base sheet in accordance with the displacement of the fixation surface portion of the base sheet due to sliding input operation by the user, forming a part of the laminate structure.

In this construction, the movable contact portion not only forms the laminate structure in the fixation surface portion but can form a laminate structure with no gap also in the outer peripheral edge portions of the key tops arranged at small intervals where the step portions are held in contact with the base sheet to leave no gap. Thus, the capacitance can be sensed with high sensitivity.

(11) In a second mode of the second aspect,
the operation member is provided with
key tops as the plurality of depressing operation portions,
a flexible base sheet for supporting the key tops so as to allow depression displacement in the direction perpendicular to the plane, and
a decoration member fixed to the base sheet so as to divide the key tops from each other to form a part of the laminate structure,
the movable contact portion of the operation member is a fixation surface portion for the key tops of the base sheet, and
the fixation surface portion enters the gap devoid of the fixation layers between the operation member and the sensor sheet through sliding input operation by the user and is displaced so as to be capable of coming into contact with the sensor sheet.

In this construction, it is possible to realize satisfactory depressing operation input and reliable sliding operation input in a key sheet provided with a decoration member allowing the same decoration as that for the key tops.

(12) In a key sheet according to claim 7,
the operation member is provided with a flexible film key sheet having display portions exhibiting characters, numbers, or the like for input operation as the plurality of depressing operation portions,
wherein the movable contact portion of the operation member is the display portions of the film key sheet, and
wherein the display portion enters the gap upon depression at a time of sliding input operation by the user and is displaced so as to be capable of coming into contact with the sensor sheet.

In this construction, it is possible to realize satisfactory depressing operation input and reliable sliding operation input in a key sheet having a sliding operation surface formed by a film key sheet.

(13) In the key sheet according to the above-mentioned aspects of the present invention, the fixation layer is a soft material layer capable of compressive deformation in accordance with the displacement of the movable contact portion of the operation member through sliding input operation by the user.

In this construction, as the movable contact portion is displaced, the movable contact portion softly undergoes compressive deformation, with the layer end portion of the fixation layer not being stiff. As a result, it is possible to reduce the requisite sliding input operation force for the user to effect contact through displacement of the movable contact portion with respect to the sensor sheet.

(14) In the key sheet according to the above-mentioned aspects of the present invention,
the operation member includes an illumination type operation member through which light from an inner light source is transmitted, and
the fixation layer includes an adhesive layer and an adhesion material layer, which have light guiding property allowing light from the inner light source to be guided.

In this construction, the fixation layer guides the light from the inner light source and can transmit the light directly to the operation member, making it possible to brightly illuminate the operation member. In particular, in the case of the key sheet of the construction of the first aspect, there is provided the fixation layer under each depressing operation portion, and hence it is possible to directly transmit the light from the inner light source to the depressing operation portion, making it possible to brightly illuminate the depressing operation portion.

In the case of the construction of the first aspect, in which the individual fixation layer is provided under each depressing operation portion, it is possible to adopt a mode in which there is provided a connecting portion connecting the fixation layers. In this construction, the connecting portion can serve as a light guide, making it possible to guide the light from the inner light source to each fixation layer through the connecting portion.

Further, it is possible to adopt a form in which the fixation layer is provided to extend over a plurality of depressing operation portions. This makes it possible to illuminate a plurality of depressing operation portions with a single fixation layer.

(15) In the key sheet according to the above-mentioned aspects of the present invention, the operation member includes an illumination type operation member through which light from an inner light source is transmitted, and the sensor sheet has a light transmitting base material sheet through which light from the inner light source is transmitted, and a light transmitting printed-circuit layer formed of a light transmitting conductive coating material on the base material sheet.

In this construction, the light from the inner light source is transmitted through the sensor sheet, making it possible to effectively illuminate the entire sliding operation surface.

(16) In the key sheet according to the above-mentioned aspects of the present invention, the operation member is an illumination type operation member through which light from an inner light source is transmitted, the sensor sheet is provided with a light transmitting base material sheet through which light from the inner light source is transmitted, and a capacitance sensing circuit layer formed by alternately stacking together a printed-circuit layer and an insulating layer on a back surface of the base material sheet whose front surface faces the operation member.

In this construction, the base material sheet serves as a light guide plate, and hence it is possible to endow the sensor sheet with a light guiding function; the light from the inner light source is transmitted through the sensor sheet, making it possible to effectively illuminate the entire sliding operation surface. Further, the base material sheet of the sensor sheet can directly transmit the light from the inner light source to the fixation layer, making it possible to brightly illuminate the operation member.

(17) In the key sheet according to the above-mentioned aspects of the present invention, at positions on a back surface of the sensor sheet corresponding to the plurality of depressing operation portions, there are provided molding pusher portions integrally fixed to the back surface through molding.

In this construction, in the case in which a contact switch is arranged on the back surface side of the sensor sheet, there is provided a molding pusher portion, and hence it is possible to reliably depress the contact switch, making it possible to accurately effect depressing operation input.

Further, as compared with the technique in which a pusher sheet in which a plurality of pushers are integrally formed is stacked as a separate member, it is possible to attain a reduction in thickness; further, it is possible to achieve a reduction in the number of components.

In the key sheet of the present invention, the fixation layer is formed in the portion of the space between the operation member and the sensor sheet under each depressing operation portion, and there is no fixation layer in the portion of the space other than that, and hence it is possible to suppress the requisite depressing operation load to a low level. Further, when a contact switch with click feel is depressed, the click feel can be easily transmitted, making it possible to realize a key sheet in which depressing operation input of satisfactory depression operability is possible due to clear click feel.

Further, there is provided the movable contact portion which enters the gap at the time of sliding input operation and which is displaced with respect to the sensor sheet so as to be capable of coming into contact therewith. As a result, it is possible to eliminate the gap between the operation member and the sensor sheet at the time of sliding input operation, making it possible to sense in a stable manner the capacitance at an in-plane position of the sliding operation surface of the sensor sheet. Thus, it is possible to realize a key sheet which allows reliable sliding operation input through accurate coordinate position detection.

Contents of the present invention are not limited to the above descriptions. An advantage, characteristic point, and use of the present invention become more obvious through the following description made with reference to the attached drawings. Further, it should be understood that all the appropriate modifications without departing from the spirit of the present invention are included in the scope of the present invention.

BRIEF DESCRIPTION OF THE DRAWINGS

In the accompanying drawings:

FIG. 3 is a partially enlarged sectional view of a sensor sheet used in a key sheet according to the present invention;

FIG. 4 is a partially enlarged sectional view of a sensor sheet used in a key sheet according to the present invention;

FIG. 5 is an explanatory view illustrating how sliding input operation is performed on the key sheet of the first embodiment;

DETAILED DESCRIPTION OF THE PREFERRED EMBODIMENTS

Figure 1:
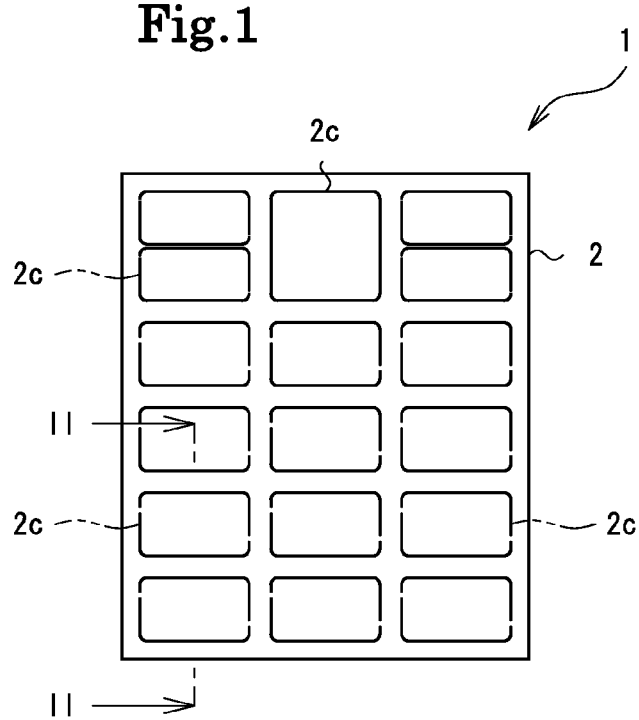
FIG. 1 is a plan view of a key sheet according to a first embodiment.

In the following, embodiments of the present invention will described with reference to the drawings. In the drawings, the reference symbols denote portions and components. Regarding the constructions and materials common to the embodiments, a redundant description thereof is omitted.

First Embodiment

FIGS. 1 through 5

Figure 2:
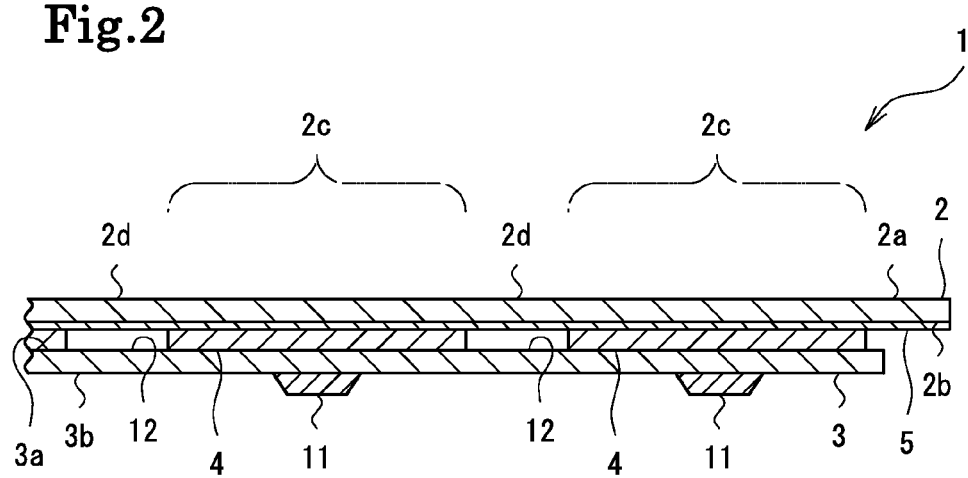
FIG. 2 is a sectional view taken along the line II-II of FIG. 1.

FIGS. 1 through 5 illustrates a key sheet 1 according to the first embodiment. FIG. 1 is a plan view of the key sheet 1. FIG. 2 is a sectional view of the key sheet 1 taken along the line II-II. FIG. 3 is a partially enlarged sectional view of a first construction of a sensor sheet 3 used in the key sheet 1. FIG. 4 is a partially enlarged sectional view of a second construction of the sensor sheet 3 used in the key sheet 1. FIG. 5 is an explanatory view illustrating how sliding input operation is performed on the key sheet 1. The key sheet 1 of the first embodiment is provided with a surface sheet 2 serving as an "operation member", the sensor sheet 3, and a fixation layer 4.

Description of the member construction; The surface sheet 2 is transparent, and is formed of a flexible film. The surface sheet 2 serves as a "film key sheet". Its surface 2a serves as a sliding operation surface, and a printed layer 5 exhibiting a display portion with numbers, characters, symbols, patterns, etc. is stacked on a back surface 2b thereof. Further, the surface sheet 2 has a plurality of depressing operation portions 2c to be depressed by a finger or the like, with each depressing operation portion 2c displaying functions through the numbers, characters, etc. on the printed layer 5. It is desirable for the hardness of the surface sheet 2 as measured by Type A durometer according to JIS K6253 to be 50 to 99, with the thickness thereof being 0.01 mm to 0.2 mm. The printed layer 5 may be formed as a single layer or a double layer. For example, in the case of a single layer construction, there is formed a hollow-character-like layer on the back surface 2b, and it is possible to display the display portion through the background due to this layer and the character configuration of the hollow portion. In the case of a double layer construction, there is formed on the back surface 2b a hollow-character-like first layer and a second layer of a different color stacked thereon and exposed through the hollow character portion from the back surface side, making it possible to display the display portion through the background due to the first layer and the character configuration due to the second layer. Another double layer construction is formed by stacking together on the back surface 2b a character-like first layer and a second layer of a different color exposed over the entire surface from the back surface side, making it possible to display the display portion through the character configuration due to the first layer and the background due to the second layer.

In the sensor sheet 3, stripe-like electrodes 7, 8 extending in directions substantially orthogonal to each other are formed as light transmitting "printed-circuit layers" on a base material sheet 6 formed of a light transmitting resin film, with the sensor sheet 3 being capable of sensing capacitance. When a finger is brought close to the sensor sheet 3, a change in capacitance value occurs, making it possible to detect the coordinate position of the finger.

More specifically, two constructions are possible: In a first construction, the stripe-like electrode 7 is formed on a front surface 6a of the base material sheet 6, and the stripe-like electrode 8 substantially orthogonal to the electrode 7 is formed on a back surface 6b, with the outer surfaces of the electrodes 7, 8 being covered with resist layers 9, 9 (FIG. 3). In the case of the first construction, it is possible to form an asperity surface on the outer surface of the back surface 3b side resist layer 9 at the position thereof corresponding to the fixation layer 4, which is opposite to the front surface 3a side resist layer 9 of the sensor sheet 3 to which the fixation layer 4 described below is fixed. In this construction, when the key sheet 1 is formed as a back-light illumination type sheet, the light entering the sensor sheet 3 can be easily guided to the fixation layer 4 through reflection by the asperity surface. Thus, it is possible to brightly illuminate the surface sheet 2.

In a second construction, the stripe-like electrode 7 is formed on one surface (back surface 6b) of the base material sheet 6, and the stripe-like electrode 8 substantially orthogonal thereto is formed with an insulating layer 10 therebetween. Further, there is provided a sensing circuit layer 40 whose outer surface is covered with the resist layer 9 (FIG. 4). In the case of the second construction, the front surface 3a of the sensor sheet 3 to which the fixation layer 4 described below is fixed constitutes the front surface 6a of the base material sheet 6, and hence, when the key sheet 1 is formed as a back-light illumination type sheet, it is possible for the base material sheet 6 of the sensor sheet 3 to transmit the light of the inner light source directly to the fixation layer 4, making it possible to brightly illuminate the surface sheet 2.

On the back surface 3b (surface opposed to a circuit board P) side of the sensor sheet 3, there are formed, at positions corresponding to the depressing operation portions 2c of the surface sheet 2, molding pusher portions 11 formed by molding and capable of depressing contact switches (not shown) (FIG. 2).

Each fixation layer 4 is formed of a light transmitting adhesive, and is provided under the back surface of the printed layer 5 provided on the back surface 2b of the surface sheet 2 at the position below each depressing operation portion 2c. The fixation layers 4 are of the same size as the depressing operation portions 2c, and serve to fix the surface sheet 2 and the sensor sheet 3 to each other. Thus, in the under-portions between the depressing operation portions 2c, there are formed gaps 12 devoid of the fixation layers 4. As described below, the surface sheet 2 described above is provided with movable contact portions 2d which enter the gaps 12 at the time of sliding input operation and which are displaced so as to be capable of coming into contact with the sensor sheet 3.

Description of the materials; Here, the materials of the components of the key sheet 1 are described. The following description is also applicable to the other embodiments described below.

As the material of the surface sheet 2, there is used a flexible, soft resin film or a rubber-like elastic member. Specifically, it is desirable for the soft resin film to be formed of a soft material having a 100% modulus (tensile stress when elongation is 100%) based on JIS K7311 of 100 MPa or less. Examples of the material include a solid member of a polyurethane resin, a polyester resin, a polyethylene resin, a polyamide resin, a polyvinyl chloride resin, a polycarbonate resin, a polyethylene terephthalate resin, an acrylic resin, or the like, and a composite of those. Of those, it is suitable to use a resin, which is thinner and softer and is more difficult to be broken than other materials, such as a polyamide resin, a polyurethane resin, a polyester resin, and a polyvinyl chloride resin, or the like. It is desirable for the rubber-like elastic member to be formed of thermosetting elastomer or thermoplastic elastomer. For example, in view of its low temperature dependence, it is desirable to adopt silicone rubber. Further, in view of its durability, it is desirable to adopt a styrene-based thermoplastic elastomer or an ester-based thermoplastic elastomer.

As the material of the base material sheet 6 constituting the sensor sheet 3, there is used a tense resin film which is flexible enough to undergo deformation at the time of depressing operation and which exhibits a restoring force (repulsive force) restoring itself to the original state by canceling the depressing operation. Examples of the material include a solid member of a polyethylene terephthalate resin, a polyethylene resin, a polypropylene resin, a polyamide resin, a polyvinyl chloride resin, a polycarbonate resin, an acrylonitrile butadiene styrene resin, a polybutylene terephthalate resin, a polyphenylene oxide resin, a polyphenylene sulfide resin, a polyurethane resin, a polyphenylene ether resin, a modified polyphenylene ether resin, a polyketone resin, or liquid crystal polymer, or a composite thereof. Further, by using a light transmitting base material sheet 3a as in this embodiment, it is possible to realize a so-called back-light illumination type key sheet.

As the material of the electrodes 7, 8 constituting the sensor sheet 3, there are used a metal foil, an electroconductive coating film, a transparent electroconductive coating film, etc. As the material of the metal foil, there is used, for example, copper, gold, aluminum or the like. As the electroconductive coating material, there is used, for example, a polymer coating film in which conductive particles of silver, carbon, or the like are dispersed. Examples of the transparent electroconductive coating film include indium tin oxide (hereinafter, referred to as "ITO"), polyacetylene-based conductive polymer, polythiophene-based conductive polymer, polypyrrole-based conductive polymer, polyparaphenylene-based conductive polymer, or the like. In particular, when the transparent electroconductive coating film is used, it is possible to brightly illuminate the surface sheet 2 in the case of a back-light illumination type key sheet.

An insulating resin is used as the material of the resist layer 9 and the insulating layer 10 constituting the sensor sheet 3. Examples of the material include a polyester-based resin, a vinyl chloride-vinyl acetate-based resin, an acrylic-based resin, a polycarbonate-based resin, a urethane-based resin, a polyolefin-based resin, an epoxy-based resin, a silicone-based resin, or the like.

Apart from the adhesion material adopted in this embodiment, the fixation layer 4 may also be formed of an adhesive, a double-sided tape using an adhesion material or the like. Examples of the adhesion material include an acrylic-based material, a urethane-based material, and a silicone-based material. Examples of the adhesive include a thermosetting adhesive, a photo-setting adhesive, a moisture setting adhesive, and a hot-melt adhesive.

The molding pusher portions 11 are formed by molding. Examples of the material to be used include a photo-setting resin, a thermosetting resin, and a thermoplastic resin.

Description of the manufacturing method; Next, an example of the method of manufacturing the key sheet 1 according to the first embodiment is described.

First, the printed layer 5 exhibiting numbers, etc. is provided on the back surface 2b of the surface sheet 2 by screen printing, and then the fixation layers 4 are formed at positions corresponding to the depressing operation portions 2c by screen printing. On the other hand, the electrodes 7, 8, the resist layer 9, etc. are formed on the base material sheet 6 by screen printing to obtain the sensor sheet 3. Further, a transparent die to which a liquid photo-setting resin is applied is aligned with the back surface 3b of the sensor sheet 3, and light is applied from the transparent die side, and the molding pusher portions 11 are integrally fixed to the back surface 3b of the sensor sheet 3 simultaneously with the curing of the photo-setting resin. Finally, the fixation layers 4 formed on the surface sheet 2 and the front surface 3a of the sensor sheet 3 are fixed to each other to obtain the key sheet 1.

Description of the input operation; Next, the input operation performed on the key sheet 1 according to the first embodiment is described.

The key sheet 1 allows both depressing input operation in which the depressing operation portions 2c are depressed and sliding input operation in which input is effected by stroking the surface 2a of the surface sheet 2.

In depressing input operation, when the depressing operation portions 2c of the surface sheet 2 are depressed, the fixation layers 4 and the sensor sheet 3 are depressed, and the molding pusher portions 11 provided on the back surface 3b of the sensor sheet 3 depress the contact switches SW to effect input.

In sliding input operation, when the surface 2a of the surface sheet 2 is stroked with a finger, the movement path of the finger is sensed by the sensor sheet 3 from a change in the capacitance value, and is detected and input as a coordinate position. In the case in which, when the finger passes over the surface 2a of the surface sheet 2, there exists the gap 12 below the finger, the movable contact portion 12d of the surface sheet 2 enters the gap 12 due to the depressing by the finger at the time of sliding input operation, and the gap 12 is eliminated (FIG. 5).

Effects of the Embodiment

The effects of the key sheet 1 according to this embodiment are described.

(1) In the key sheet 1, the fixation layers 4 are formed at the positions below the depressing operation portions 2c, and there are no fixation layers 4 in the portions around the depressing operation portions 2c. Thus, it is possible to suppress the depressing operation load to a low level at the time of depressing input operation.

(2) Further, when the contact switches SW with click feel are depressed, the click feel can be easily transmitted, making it possible to realize a key sheet 1 allowing depressing operation input with satisfactory depression operability due to clear click feel.

(3) The surface sheet 2 has the movable contact portions 2d which enter the gaps 12 at the time of sliding input operation and which are displaced so as to be capable of coming into contact with the sensor sheet 3, and hence, at the time of sliding input operation, it is possible to eliminate the gaps 12 between the surface sheet 2 and the sensor sheet 3, making it possible to effect in a stable manner the sensing of capacitance at an in-plane position of the sliding operation surface of the sensor sheet 3. Thus, it is possible to realize a key sheet 1 allowing reliable sliding operation input through accurate coordinate position detection.

(4) The operation member is formed of the surface sheet 2, and hence the key sheet 1 can have a flat sliding operation surface, making it possible to realize satisfactory depressing operation input and reliable sliding operation input as described above.

(5) The fixation layers 4 are formed of a light transmitting adhesion material, and hence, in the case of an illumination type key sheet 1, the fixation layers 4 are provided below the depressing operation portions 2c. Thus, the fixation layers 4 can guide the light from the inner light source and transmit the light directly to the depressing operation portions 2c, making it possible to brightly illuminate the depressing operation portions 2c.

(6) The sensor sheet 3 is formed by the light transmitting base material sheet 6 and the light transmitting electrodes 7, 8, etc., and hence the light from the inner light source is transmitted through the sensor sheet 3, making it possible to effectively illuminate the entire surface 2a of the surface sheet 2.

(7) There are provided the molding pusher portions 11 integrally fixed to the positions of the back surface 3b of the sensor sheet 3 corresponding to the depressing operation portions 2c, and hence, when the contact switches SW are arranged on the back surface 3b side of the sensor sheet 3, the contact switches SW can be reliably depressed, making it possible to effect accurate depressing operation input.

(8) Further, as compared with the technology in which a pusher sheet having a plurality of pushers integrally formed thereon is stacked as a separate member, it is possible to achieve a reduction in thickness, making it possible to achieve a further reduction in the number of components.

Modification of the First Embodiment

Figure 6:
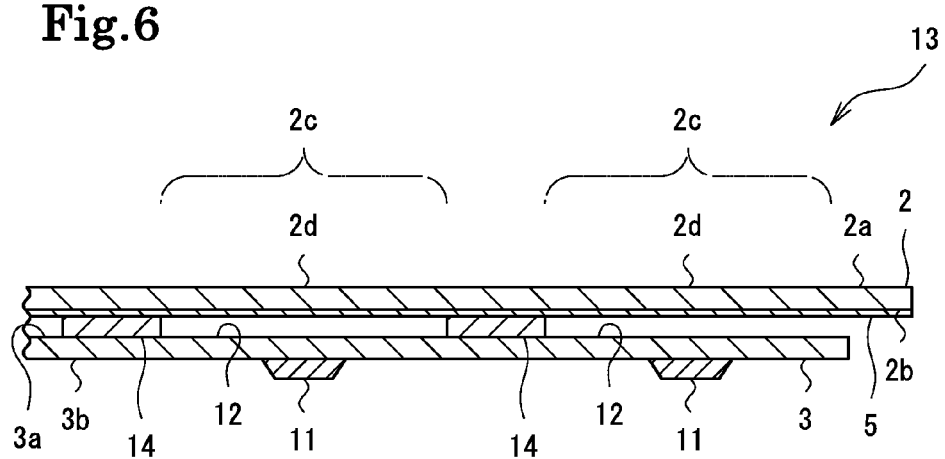
FIG. 6 is a sectional view, corresponding to FIG. 2, of a modification of the key sheet of the first embodiment.
Figure 7:
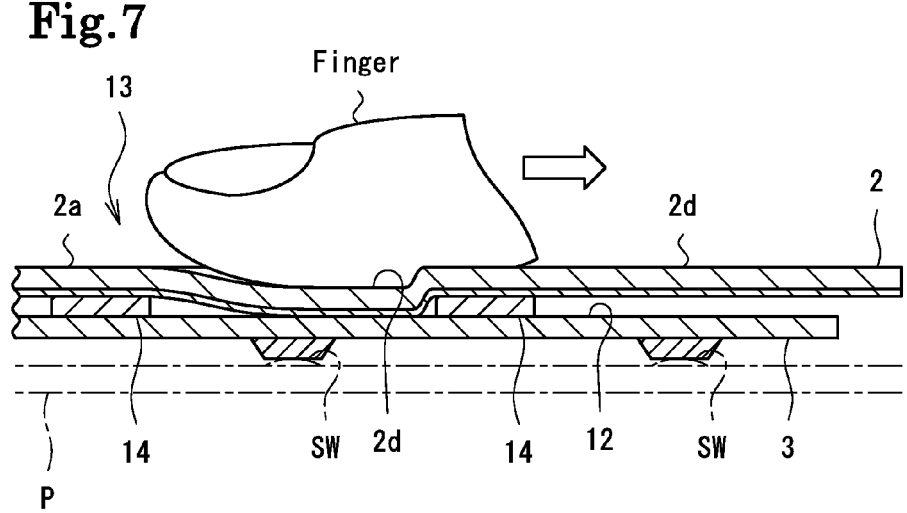
FIG. 7 is an explanatory view illustrating how sliding input operation is performed on the modification of the key sheet of the first embodiment.

FIGS. 6 and 7

FIGS. 6 and 7 illustrate a key sheet 13 according to a modification. FIG. 6 is a sectional view of the key sheet 13, and FIG. 7 is an explanatory view illustrating how sliding input operation is performed on the key sheet 13. While in the key sheet 1 according to the first embodiment, the fixation layers 4 are provided at adjacent positions below the depressing operation portions 2c and the movable contact portions 2d are provided at adjacent positions between the depressing operation portions 2c of the surface sheet 2, in the key sheet 13 according to the modification, fixation layers 14 are provided below the portions between the adjacent depressing operation portions 2c, with the movable contact portions 2d being provided at the positions of the surface sheet 2 corresponding to the depressing operation portions 2c.

In this construction, the fixation layers 14 are formed in the portions below the portions between the adjacent depressing operation portions 2c, and there are no fixation layers 14 below the depressing operation portions 2c but the gaps 12 are formed, and hence it is possible to suppress the depression load to a low level. Further, when the contact switches SW with click feel are depressed, the click feel can be easily transmitted, making it possible to realize depressing operation input of satisfactory depression operability through clear click feel.

Further, the movable contact portions 2d are provided at the positions of the surface sheet 2 corresponding to the depressing operation portions 2c, and hence it is possible to eliminate the gaps 12 at the time of sliding input operation (FIG. 7), making it possible to effect in a stable manner the sensing of capacitance at an in-plane position of the sliding operation surface of the sensor sheet 3. Thus, it is possible to realize reliable sliding operation input through accurate coordinate position detection.

Second Embodiment

Figure 8:
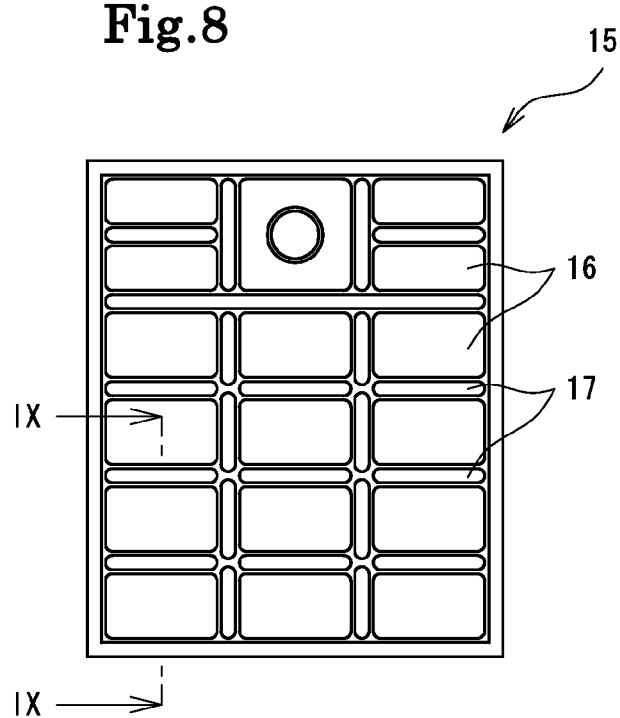
FIG. 8 is a plan view of a key sheet according to a second embodiment.
Figure 9:
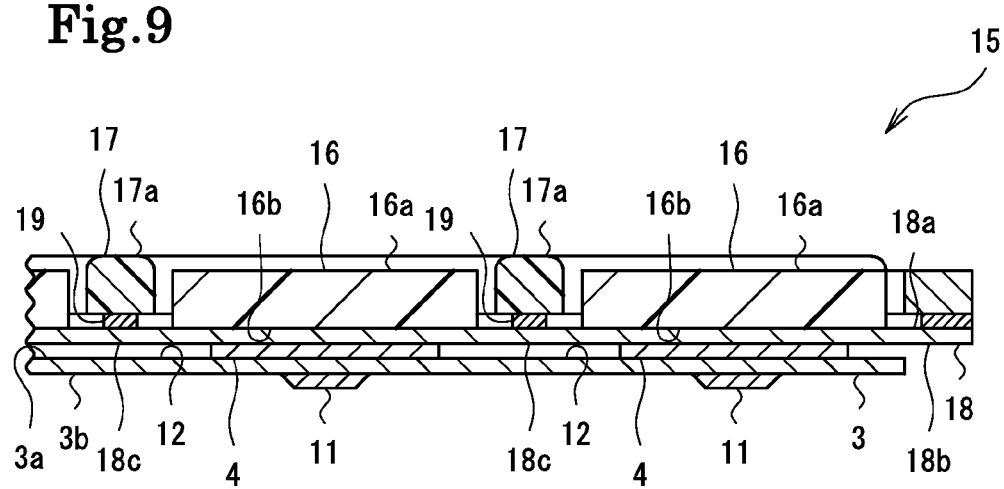
FIG. 9 is a sectional view taken along the line IX-IX of FIG. 8.
Figure 10:
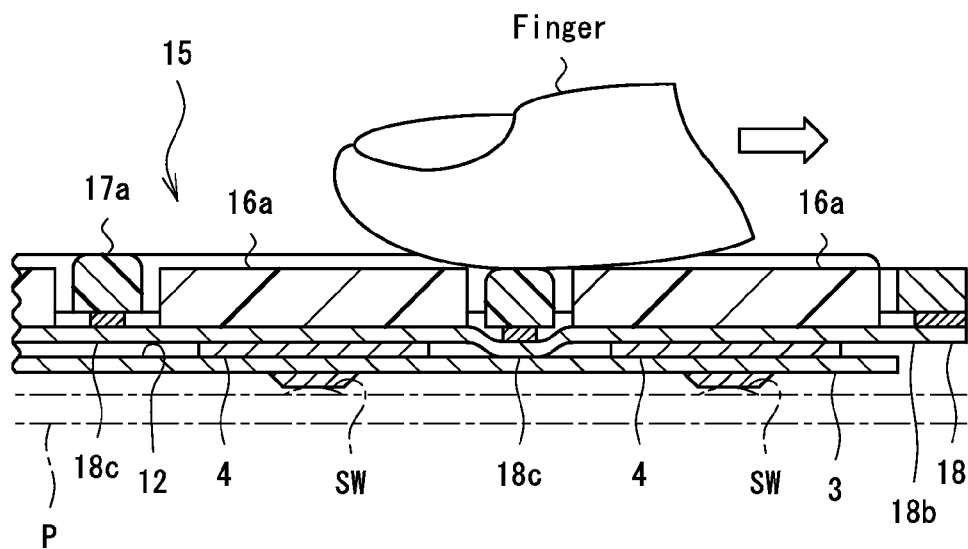
FIG. 10 is an explanatory view illustrating how sliding input operation is performed on the key sheet of the second embodiment.

FIGS. 8 through 10

FIGS. 8 through 10 illustrate a key sheet 15 according to the second embodiment. FIG. 8 is a plan view of the key sheet 15, FIG. 9 is a sectional view, taken along the line IX-IX, of the key sheet 15, and FIG. 10 is an explanatory view illustrating how sliding input operation is performed on the key sheet 15. The key sheet 15 according to the second embodiment differs from the key sheet 1 according to the first embodiment in that the key sheet 15 is provided with key tops 16 as "operation members", decoration member 17, and a base sheet 18, with the surface sheet 2 being eliminated. Otherwise, the key sheet 15 is of the same construction as the key sheet 1.

Description of the component construction; The key tops 16 are formed of a transparent hard resin in a substantially rectangular configuration. The key tops 16 form the individual "depressing operation portions", and top surfaces 16a of the plurality of key tops 16 constitute the sliding operation surface. Further, display portions representing numbers, etc. are provided on the top surfaces 16a or bottom surfaces 16b of the key tops 16. The bottom surfaces 16b of the key tops 16 are fixed to a surface 18a of the base sheet 18 described below.

The decoration members 17 are formed of a hard resin, and are fixed to the surface 18a of the base sheet 18 described below by an adhesive 19 so as to divide the key tops 16 from each other. Top surfaces 17a of the decoration members 17 protrude higher than the top surfaces 16a of the key tops 16.

The base sheet 18 is formed as a light transmitting flexible sheet. Further, the base sheet 18 supports the key tops 16 and the decoration members 17 so as to allow depression displacement in a direction perpendicular to the plane of the sliding operation surface. It is desirable for the hardness of the base sheet 18 as measured by the type A durometer according to JIS K 6253 to be 50 to 99, with its thickness being 0.01 mm to 0.2 mm.

In the key sheet 15, the fixation layers 4 are provided on the back surface 18b of the base sheet 18 at positions below the key tops 16. The fixation area of the fixation layers 4 with respect to the base sheet 18 and the sensor sheet 3 is small, that is, it is not less than 25% but less than 100% with respect to the fixation area of the key tops 16 with respect to the base sheet 18. Thus, there are formed below portions between the key tops 16 the gaps 12 devoid of the fixation layers 4. As described below, fixation surface portions 18c of the decoration members 17, which enter the gaps 12 at the time of sliding input operation and which are displaced so as to be capable of coming into contact with the sensor sheet 3, that is, the non-fixation portions 18c of the key tops 16, are provided as "movable contact portions".

Description of the materials; Here, the materials of the components of the key sheet 15 are described. The following description is also applicable to the other embodiments described below.

As a material of the key top 16 and the decoration member 17, it is preferable to use a thermoplastic resin or a reactive resin for satisfying demands for higher mechanical strength and resistance, weight reduction, and the like. Examples of those resins include a polycarbonate resin, a polyethylene terephthalate resin, a polymethyl methacrylate resin, a polypropylene resin, a polystyrene resin, a polyacrylic copolymer resin, a polyolefin resin, an acrylonitrile butadiene styrene resin, a polyester resin, an epoxy resin, a polyurethane resin, a polyamide resin, and a silicone resin. When a consideration is made to workability of those hard resins, it is preferable to use a polycarbonate resin, a polymethyl methacrylate resin, a polyacrylic copolymer resin, or an acrylonitrile butadiene styrene resin. When a consideration is also made to transparency thereof, it is preferable to use a polycarbonate resin, a polymethyl methacrylate resin, or a polyacrylic copolymer resin.

As the material of the base sheet 18, a soft resin film or a rubber-like elastic member is used. Specifically, it is desirable that the material thereof be a soft material having a tensile elongation based on JIS K7311 of 400% or more and a 100% modulus (tensile stress when elongation is 100%) also based on JIS K7311 of 100 MPa or less. Examples of the soft resin film include a solid member of a polyurethane resin, a polyester resin, a polyethylene resin, a polyamide resin, a polyvinyl chloride resin, a polycarbonate resin, a polyethylene terephthalate resin, an acrylic resin, or the like, and a composite of those. Of those, it is suitable to use a resin, which is thinner and softer and is more difficult to be broken than other materials, such as a polyamide resin, a polyurethane resin, a polyester resin, and a polyvinyl chloride resin, silicone rubber, or the like. It is desirable for the rubber-like elastic member to be formed of thermosetting elastomer or thermoplastic elastomer having good repulsive property. In particular, in view of its low temperature dependence, it is desirable to adopt silicone rubber. Further, in view of its durability, it is desirable to adopt a styrene-based thermoplastic elastomer or an ester-based thermoplastic elastomer.

Description of the manufacturing method; Next, an example of the method of manufacturing the key sheet 15 according to the second embodiment is described.

First, the key tops 16 are formed by injection molding, with display portions being provided on the top surfaces 16a or the bottom surfaces 16b thereof. The key tops 16 are inserted into the molding die for the base sheet 18, and are integrally fixed to the base sheet 18 simultaneously with the molding thereof. After this, the decoration members 17, which are formed by injection molding separately from the key tops 16, are fixed to the front surface 18a of the base sheet 18 so as to divide the key tops 16 from each other by means of an adhesive 19, and the fixation layers 4 are formed by screen printing at the positions of the back surface 18b of the base sheet 18 corresponding to the key tops 16. Apart from this, the sensor sheet 3 is obtained through forming by screen printing of the electrodes 7, 8, the resist layer 9, etc. on the base material sheet 6, and the molding pusher portions 11 are integrally fixed to the back surface 3b of the sensor sheet 3. Finally, the fixation layers 4 formed on the base sheet 18 and the front surface 3a of the sensor sheet 3 are fixed to each other, whereby the key sheet 15 can be obtained. When fixing the key tops 16 and the base sheet 18 integrally to each other, primer or the like may be previously applied to the bottom surfaces 16b of the key tops 16, thereby enhancing the fixation force.

Description of the input operation; Next, the input operation performed on the key sheet 15 according to the second embodiment is described.

The key sheet 15 allows both depressing input operation in which the key tops 16 are depressed and sliding input operation in which input is effected by stroking the top surfaces 16a of the key tops 16 and the top surfaces 17a of the decoration members 17.

In depressing input operation, when the key tops 16 are depressed, the fixation layers 4 and the sensor sheet 3 are depressed, and the molding pusher portions 11 provided on the back surface 3b of the sensor sheet 3 depress the contact switches SW to effect input.

In sliding input operation, when the top surfaces 16a of the key tops 16 and the top surfaces 17a of the decoration members 17 are stroked by a finger, the movement path of the finger is sensed by the sensor sheet 3 from a change in capacitance value, and is detected and input as a coordinate position. When the finger passes over the top surfaces 17a of the decoration members 17, there exist the gaps 12 below the finger. Due to the depression by the finger at the time of sliding input operation, the decoration members 17 sink, and the fixation surface portions 18c of the base sheet 18 as the "movable contact portions" enter the gaps 12, whereby the gaps 12 are eliminated (FIG. 10).

Effects of the Embodiment

The effects of the key sheet 15 according to the second embodiment are described.

(1) In the key sheet 15, the fixation layers 4 are formed at the positions below the key tops 16, and there are no fixation layers 4 in the portions around the key tops 16 but the gaps 12 are formed, and hence it is possible to suppress the depressing operation load to a low level at the time of depressing input operation.

(2) Further, when the contact switches SW with click feel are depressed, the click feel can be easily transmitted, making it possible to realize a key sheet 15 allowing depressing operation input with satisfactory depression operability due to clear click feel.

(3) The base sheet 18 has the fixation surface portions 18c which enter the gaps 12 at the time of sliding input operation and which are displaced so as to be capable of coming into contact with the sensor sheet 3, and hence, at the time of sliding input operation, it is possible to eliminate the gaps 12 between the base sheet 18 and the sensor sheet 3, making it possible to effect in a stable manner the sensing of capacitance at an in-plane position of the sliding operation surface of the sensor sheet 3. Thus, it is possible to realize a key sheet 15 allowing reliable sliding operation input through accurate coordinate position detection. In this way, also in the case of the key sheet 15, which is provided with the decoration members 17 capable of decoration similar to that of the key tops 16, it is possible to realize satisfactory depressing operation input and reliable sliding operation input.

(4) The depressing operation portions are formed as the three-dimensional key tops 16, and hence each depressing operation portion of the sliding operation surface can be easily sensed for each key top 16 by the feel of the finger, making it possible to realize a sliding operation surface in which the depressing operation portions can be easily distinguished. Thus, it is possible to realize a key sheet 15 of satisfactory depression operability.

(5) The fixation area of the fixation layers 4 with respect to the base sheet 18 and the sensor sheet 3 is not less than 25% but less than 100% of the fixation area of the key tops 16 with respect to the base sheet 18, and hence it is possible to increase the portion of the sensor sheet 3 deflected at the time of depressing operation, thereby reducing the depression load. Thus, when the contact switches SW with click feel are depressed, the click feel can be easily transmitted, making it possible to realize satisfactory depression operability through clear click feel.

(6) The top surfaces 17a of the decoration members 17 protrude further beyond the top surfaces 16a of the key tops 16, and hence the decoration member can easily sink toward the sensor sheet 3, making it easy for the fixation surface portions 18c to enter the gaps 12 below the decoration members 17 at the time of sliding input operation. Thus, at the time of sliding input operation, the gaps 12 between the operation members 17 and the sensor sheet 3 can be easily eliminated, making it possible to accurately sense the capacitance of the sensor sheet 3.

(7) The fixation layers 4 are formed of an adhesion material, and hence, in the case of an illumination type key sheet 15, the fixation layers 4 are provided below the key tops 16, thus, the fixation layers 4 can guide the light from the inner light source and transmit it to the key tops 16, making it possible to brightly illuminate the key tops 16.

(8) The sensor sheet 3 is formed by the light transmitting base material sheet 6 and the light transmitting electrodes 7, 8, etc., and hence the light from the inner light source is transmitted through the sensor sheet 3, making it possible to effectively illuminate the key tops 16.

(9) There are provided the molding pusher portions 11 integrally fixed to the positions of the back surface 3b of the sensor sheet 3 corresponding to the key tops 16, and hence, when the contact switches SW are arranged on the back surface 3b side of the sensor sheet 3, the contact switches SW can be reliably depressed, making it possible to effect accurate depressing operation input.

(10) Further, as compared with the technology in which a pusher sheet having a plurality of pushers integrally formed thereon is stacked as a separate member, it is possible to achieve a reduction in thickness, making it possible to achieve a further reduction in the number of components.

Modification of the Second Embodiment

FIG. 11

Figure 11:
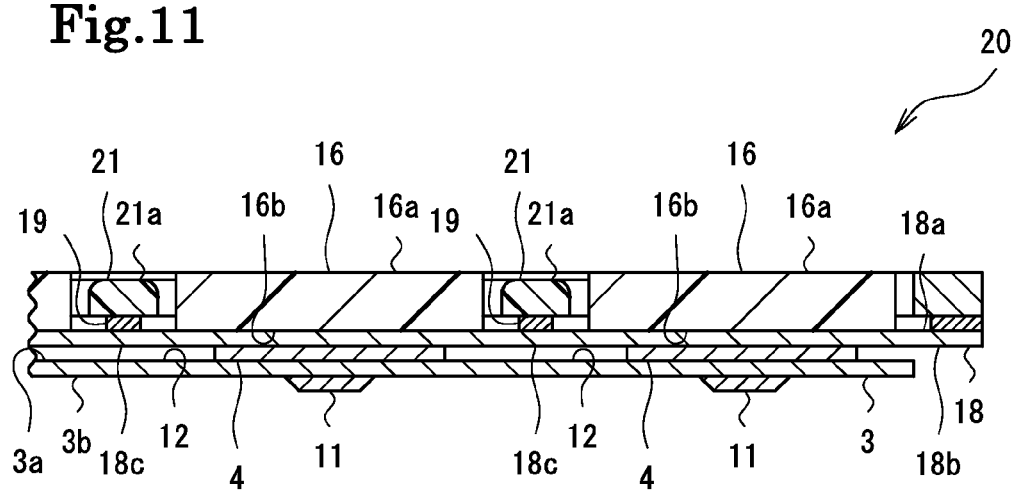
FIG. 11 is a sectional view, corresponding to FIG. 9, of a modification of the key sheet of the second embodiment.

FIG. 11 illustrates a key sheet 20 according to a modification. FIG. 11 is a sectional view of the key sheet 20. While in the key sheet 15 of the second embodiment the top surfaces 17a of the decoration members 17 protrude beyond the top surfaces 16a of the key tops 16, in the key sheet 20 of the modification, the top surface 21a of decoration members 21 may be recessed with respect to the top surfaces 16a of the key tops 16.

Also in this construction, due to the formation of the gaps 12, it is possible to suppress the depression load to a low level. When the contact switches SW with click feel are depressed, it is possible to realize a depressing operation input of satisfactory depression operability due to the clear click feel.

Further, due to the provision of the fixation surface portions 18c which enter the gaps 12 and which are displaced so as to be capable of coming into contact with the sensor sheet 3, it is possible to sense in a stable manner the capacitance at an in-place position of the sliding operation surface of the sensor sheet 3. Thus, it is possible to realize reliable sliding operation input through accurate coordinate position detection.

Third Embodiment

Figure 12:
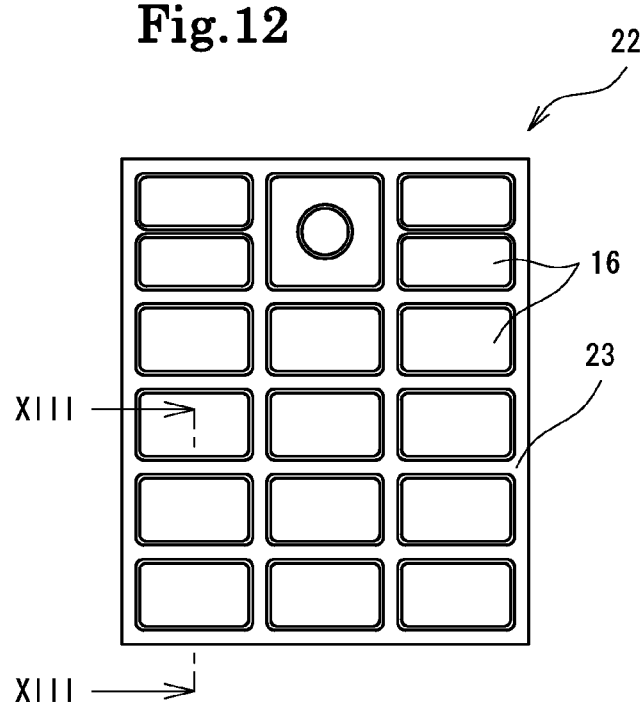
FIG. 12 is a plan view of a key sheet according to a third embodiment.
Figure 13:
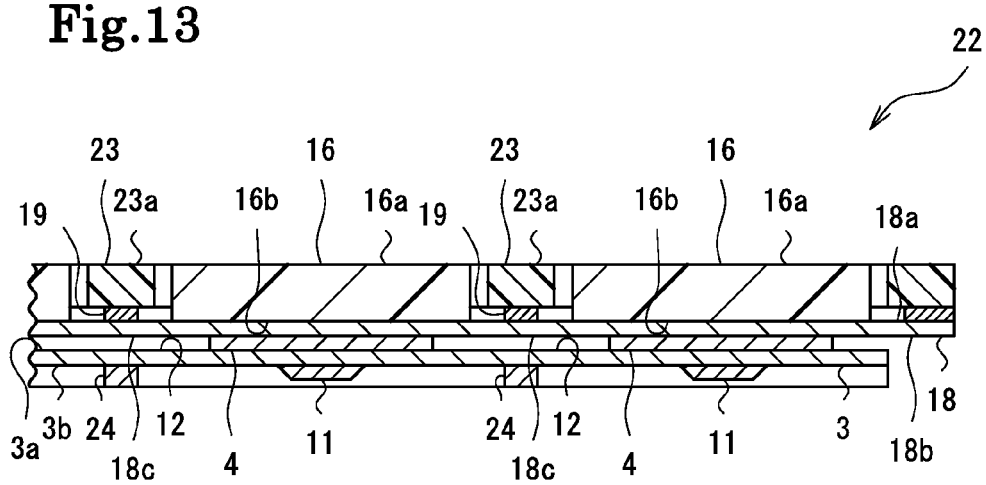
FIG. 13 is a sectional view taken along the line XIII-XIII of FIG. 12.
Figure 14:
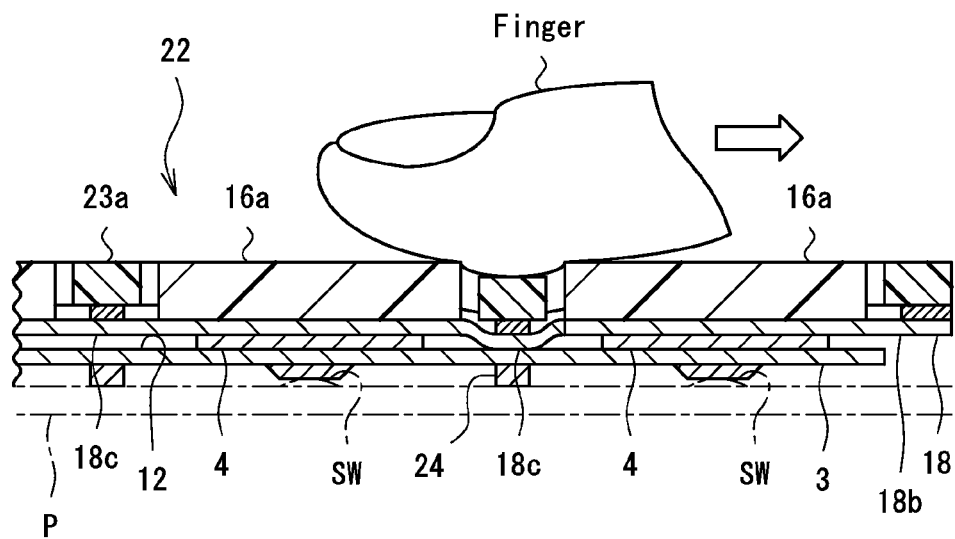
FIG. 14 is an explanatory view illustrating how sliding input operation is performed on the key sheet of the third embodiment.

FIGS. 12 through 14

FIGS. 12 through 14 illustrate a key sheet 22 according to the third embodiment. FIG. 12 is a plan view of the key sheet 22, FIG. 13 is a sectional view of the key sheet 22 taken along the line XIII-XIII, and FIG. 14 is an explanatory view illustrating how sliding input operation is performed on the key sheet 22. The key sheet 22 according to the third embodiment differs from the key sheet 15 according to the second embodiment in the construction of a decoration member 23 and the provision of a leg portion 24 on the sensor sheet 3. Otherwise, it is of the same construction as the key sheet 15.

Description of the member construction; The decoration member 23 is a single, lattice-like member, and the top surface 23a thereof is flush with the top surfaces 16a of the key tops 16.

The leg portion 24 is formed of hard resin as a single, lattice-like configuration that is substantially the same as that of the decoration member 23. It is fixed to the back surface 3b of the sensor sheet 3 by adhesive (not shown).

Description of the materials; here, the materials of the components of the key sheet 22 are described. The following description is also applicable to the other embodiments described below.

As a material of the leg portion 24, it is preferable to use a thermoplastic resin or a reactive resin for satisfying demands for higher mechanical strength and resistance, weight reduction, and the like. Examples of those resins include a polycarbonate resin, a polyethylene terephthalate resin, a polymethyl methacrylate resin, a polypropylene resin, a polystyrene resin, a polyacrylic copolymer resin, a polyolefin resin, an acrylonitrile butadiene styrene resin, a polyester resin, an epoxy resin, a polyurethane resin, a polyamide resin, and a silicone resin. When a consideration is made on workability of those hard resins, it is preferable to use a polycarbonate resin, a polymethyl methacrylate resin, a polyacrylic copolymer resin, or an acrylonitrile butadiene styrene resin. Further, when a consideration is made on transparence thereof, it is preferable to use a polycarbonate resin, a polymethyl methacrylate resin, or a polyacrylic copolymer resin.

Description of the manufacturing method; Next, an example of the method of manufacturing the key sheet 22 according to the third embodiment is described.

First, the key tops 16 are formed by injection molding, with display portions being provided on the top surfaces 16a or the bottom surfaces 16b thereof. The key tops 16 are inserted into the mold for the base sheet 18, and are fixed to the base sheet 18 simultaneously with the molding thereof. After that, the decoration members 23 formed by injection molding separately from the key tops 16 are fixed to the front surface 18a of the base sheet 18 so as to divide the key tops 16 from each other by means of adhesive 19, and the fixation layers 4 are formed by screen printing at the positions of the back surface 18b of the base sheet 18 corresponding to the key tops 16. Apart from this, the sensor sheet 3 is obtained through screen printing of the electrodes 7, 8, the resist layer 9, etc. on the base material sheet 6. After that, the molding pusher portions 11 are integrally fixed to the back surface 3b of the sensor sheet 3. Further, the leg portions 24 separately formed by injection molding are fixed by adhesive. Finally, the fixation layers 4 formed on the base sheet 18 and the front surface 3a of the sensor sheet 3 are fixed to each other, whereby the key sheet 22 is obtained.

Description of the input operation; Next, the input operation performed on the key sheet 22 according to the third embodiment is described.

The key sheet 22 allows, similarly to the key sheet 15, both depressing input operation in which the key tops 16 are depressed and sliding input operation in which input is effected by stroking the top surfaces 16a of the key tops 16 and top surfaces 23a of the decoration members 23.

In depressing input operation, when the key tops 16 are depressed, the fixation layers 4 and the sensor sheet 3 are depressed, and the molding pusher portions 11 provided on the back surface 3b of the sensor sheet 3 depress the contact switches SW to effect input.

In sliding input operation, when the top surfaces 16a of the key tops 16 and the top surface 23a of the decoration member 23 are stroked by a finger, the movement path of the finger is sensed by the sensor sheet 3 from a change in capacitance value, and is detected and input as a coordinate position. When the finger passes over the top surface 23a of the decoration member 23, there exist the gaps 12 below the finger. However, through depression by the finger at the time of sliding input operation, the decoration member 23 sinks and the fixation surface portions 18c of the base sheet 18 as the "movable contact portions" enter the gaps 12 to thereby eliminate the gaps 12 (FIG. 14).

Description of the effects; The key sheet 22 according to the third embodiment provides the same effects as those of the key sheet 15 according to the second embodiment. Further, it provides the following effects:

(1) In the key sheet 22, the decoration member 23 is a single member, and hence its fixation to the base sheet 18 is facilitated. Further, it is possible to reduce the number of components.

(2) Since the leg portion 24 is provided on the back surface 3b of the sensor sheet 3, when the decoration member 23 sinks at the time of sliding input operation, and the fixation surface portions 18c of the base sheet 18 as the "movable contact portions" enter the gaps 12 to eliminate the gaps 12, it is possible to support the sensor sheet 3 from the back surface 3b side, making it possible to reduce shaking and deflection of the sensor sheet 3. Thus, it is possible to realize a reliable sliding operation input through accurate coordinate position detection.

Figure 15:
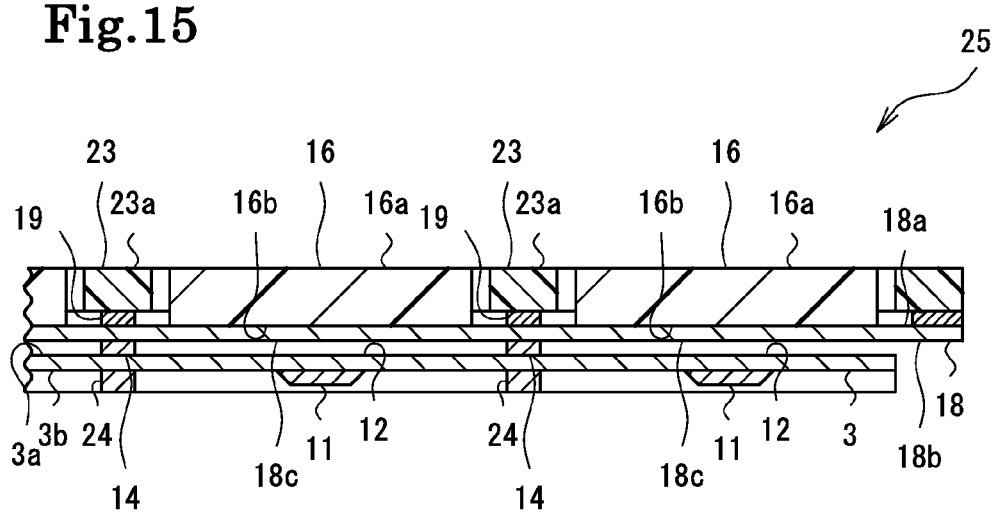
FIG. 15 is a sectional view, corresponding to FIG. 13, of a modification of the key sheet of the third embodiment.
Figure 16:
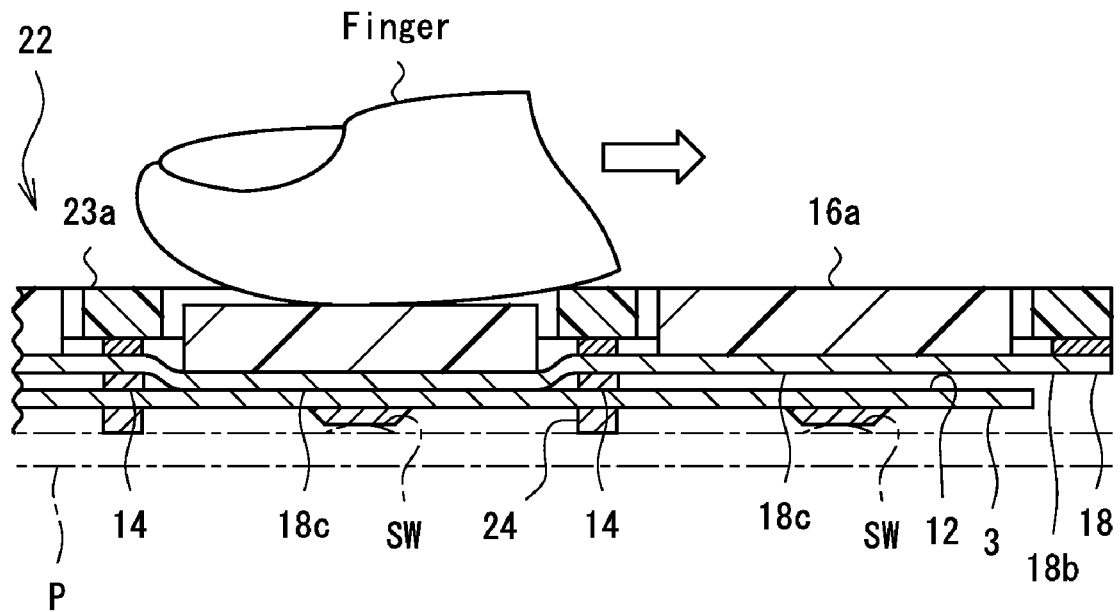
FIG. 16 is an explanatory view illustrating how sliding input operation is performed on the modification of the key sheet of the third embodiment.

Modification of the Third Embodiment cl FIGS. 15 and 16

FIGS. 15 and 16 illustrate a key sheet 25 according to a modification. FIG. 15 is a sectional view of the key sheet 25, and FIG. 16 is an explanatory view illustrating how sliding input operation is performed on the key sheet 25. While in the key sheet 22 of the third embodiment the fixation layers 4 are provided at positions below the key tops 16, and the fixation surface portions 18c of the decoration member 23 are provided as the "movable contact portions" at the adjacent positions of the base sheet 18 between the key tops 16, in the key sheet 25 of the modification, fixation layers 14 are provided below the intervals between the adjacent key tops 16, and the fixation surface portions 18c of the key tops 16 on the base sheet 18 can serve as the "movable contact portions."

In this construction, the fixation layers 14 are formed in the portions below the portions between the adjacent key tops 16, and there are no fixation layers 14 below the key tops 16 but the gaps 12 are formed, and hence it is possible to suppress the depression load to a low level. Further, when the contact switches SW with click feel are depressed, the click feel can be easily transmitted, making it possible to realize a depressing operation input of satisfactory depression operability through clear click feel.

Further, the fixation surface portions 18c of the base sheet 18 serve as the "movable contact portions", and hence it is possible to eliminate the gaps 12 at the time of sliding input operation (FIG. 16), making it possible to effect in a stable manner the sensing of capacitance at an in-plane position of the sliding operation surface of the sensor sheet 3. Thus, it is possible to realize a reliable sliding operation input through accurate coordinate position detection.

Fourth Embodiment

FIGS. 17 through 20

Figure 17:
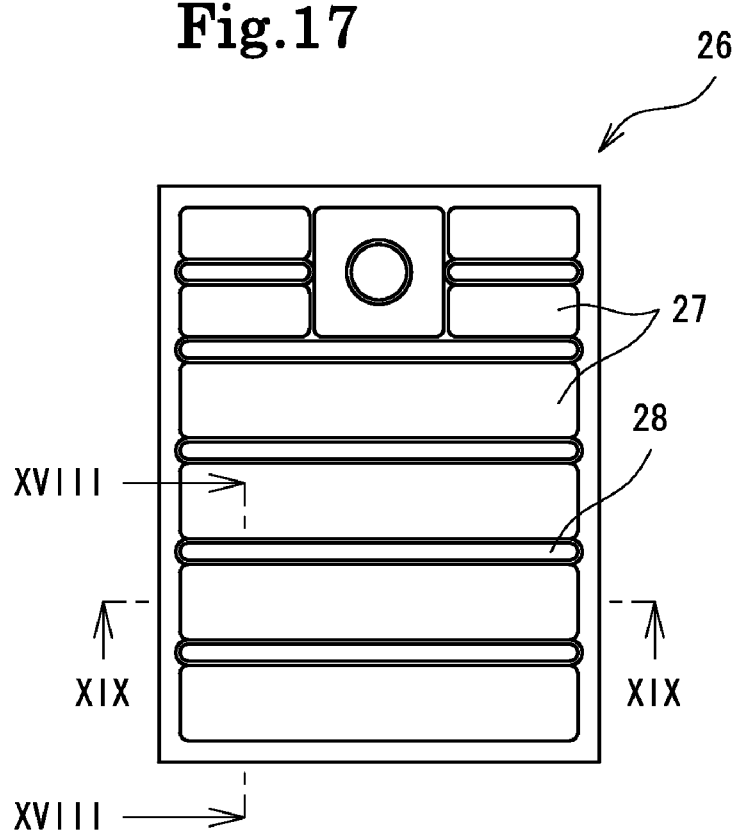
FIG. 17 is a plan view of a key sheet according to a fourth embodiment.
Figure 18:
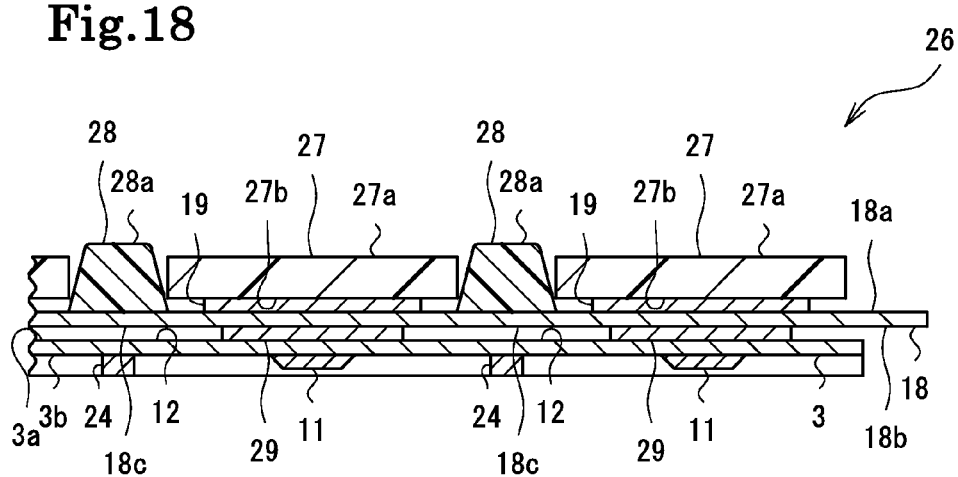
FIG. 18 is a sectional view taken along the line XVIII-XVIII of FIG. 17.
Figure 19:
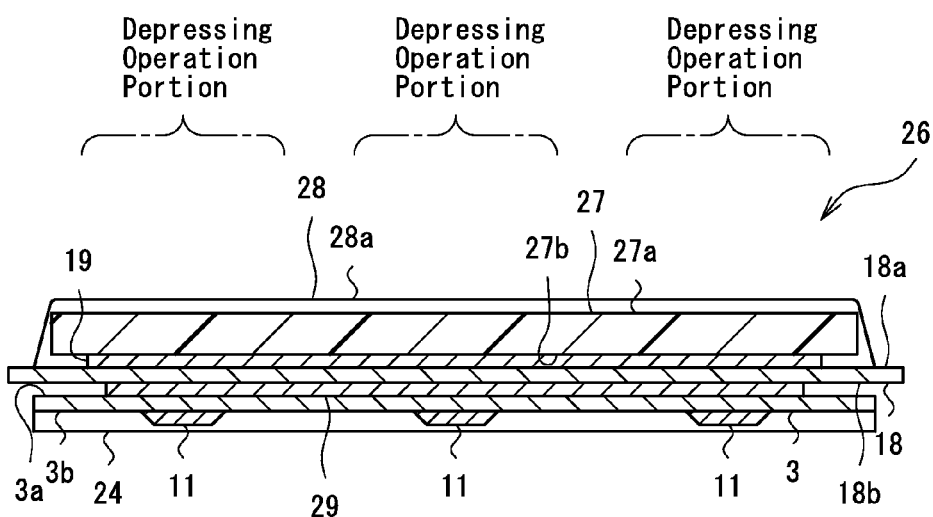
FIG. 19 is a sectional view taken along the line XIX-XIX of FIG. 17.
Figure 20:
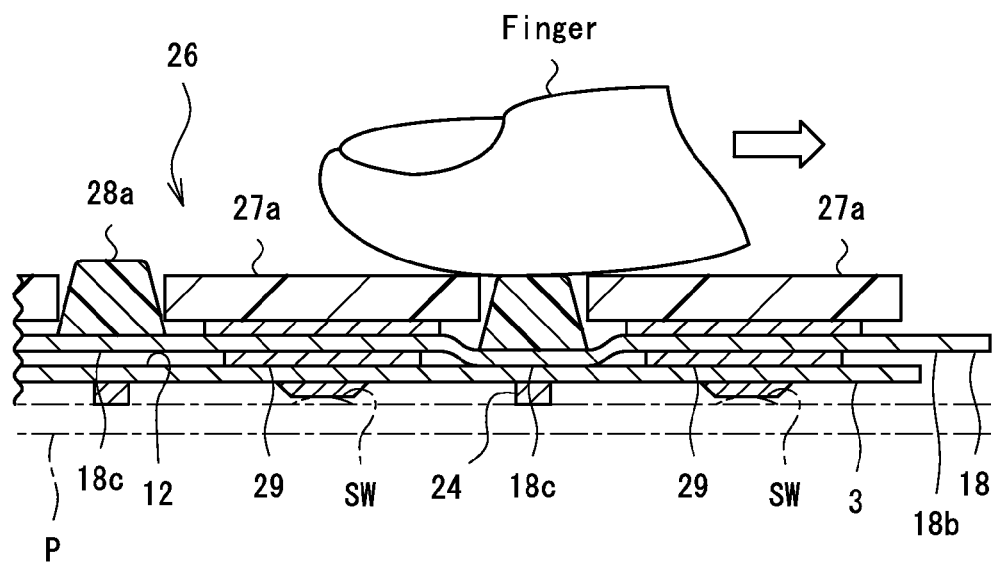
FIG. 20 is an explanatory view illustrating how sliding input operation is performed on the key sheet of the fourth embodiment.

FIGS. 17 through 20 illustrate a key sheet 26 according to the fourth embodiment. FIG. 17 is a plan view of the key sheet 26, FIG. 18 is a sectional view of the key sheet 26 taken along the line XVIII-XVIII, FIG. 19 is a sectional view of the key sheet 26 taken along the line XIX-XIX, and FIG. 20 is an explanatory view illustrating how sliding input operation is performed on the key sheet 26. The key sheet 26 according to the fourth embodiment differs from the key sheet 22 according to the third embodiment in the construction of the key tops 27, the decoration members 28 and the fixation layer 29. Otherwise, it is of the same construction as the key sheet 22.

Description of the member construction; The key tops 27 are formed by a resin film, and one key top 27 has a plurality of "depressing operation portions." As illustrated in FIG. 17, in this embodiment, the key top 27 on the lower side of the key sheet 26, for example, is of a rectangular, laterally elongated configuration in plan view, forming three "depressing operation portions." Display portions representing numbers, etc. are provided on the top surfaces 27a or the bottom surfaces 27b of the key tops 27. The bottom surfaces 27b of the key tops 27 are fixed to the front surface 18a of the base sheet 18 by adhesive 19.

The decoration members 28 are formed of a hard resin, and are fixed to the surface 18a of the base sheet 18 so as to divide the key tops 27 from each other. The top surfaces 28a of the decoration members 28 protrude higher than the top surfaces 27a of the key tops 27.

As illustrated in FIG. 19, a fixation layer 29 is provided on the back surface 18b of the base sheet 18 and below the key tops 27. That is, it is of a rectangular, laterally elongated configuration in plan view similarly to the key tops 27, and no gaps 12 devoid of the fixation layer 29 are formed between the "depressing operation portions" adjacent in the lateral direction of the key tops 27. The fixation area of the fixation layer 29 with respect to the base sheet 18 and the sensor sheet 3 is small, that is, it is not less than 25% but less than 100% with respect to the fixation area of the adhesive 19 for fixing the key tops 27 to the base sheet 18.

Description of the manufacturing method; Next, an example of the method of manufacturing the key sheet 26 according to the fourth embodiment is described.

First, the decoration members 28 are formed by injection molding, and the decoration members 28 are inserted into the mold for the base sheet 18, and are fixed to the base sheet 18 simultaneously with the molding thereof. After that, the display portions are provided on one side of a resin film and stamping is performed thereon to obtain the key tops 27, which are fixed to the front surface 18a of the base sheet 18 by the adhesive 19, with the fixation layers 4 being formed by screen printing at the positions of the back surface 18b of the base sheet 18 corresponding to the key tops 27. Apart from this, the sensor sheet 3 is obtained through screen printing of the electrodes 7, 8, the resist layer 9, etc. on the base material sheet 6. After that, the molding pusher portions 11 are integrally fixed to the back surface 3b of the sensor sheet 3, and a leg portion 14 separately formed by injection molding is further fixed thereto. Finally, the fixation layers 4 formed on the base sheet 18 and the front surface 3a of the sensor sheet 3 are fixed to each other, whereby the key sheet 26 is obtained. When fixing the decoration members 28 and the base sheet 18 integrally to each other, primer or the like may be previously applied to the decoration members 28, thereby enhancing the fixation force.

Description of the input operation; Next, the input operation performed on the key sheet 26 according to the fourth embodiment is described.

The key sheet 26 allows both depressing input operation in which the key tops 27 are depressed and sliding input operation in which input is effected by stroking the top surfaces 27a of the key tops 27 and the top surfaces 28a of the decoration members 28.

In depressing input operation, when the key tops 27 are depressed, the fixation layers 29 and the sensor sheet 3 are depressed, and the molding pusher portions 11 provided on the back surface 3b of the sensor sheet 3 depress the contact switches SW to effect input.

In sliding input operation, when the top surfaces 27a of the key tops 27 and the top surface 28a of the decoration members 28 are stroked by a finger, the movement path of the finger is sensed by the sensor sheet 3 from a change in capacitance value, and is detected and input as a coordinate position. When the finger passes over the top surfaces 28a of the decoration members 28, there exist the gaps 12 below the finger. However, due to the depression by the finger at the time of sliding input operation, the decoration members 28 sink, and the fixation surface portions 18c of the base sheet 18 as the "movable contact portions" enter the gaps 12, whereby the gaps 12 are eliminated (FIG. 20).

Description of the effects; The key sheet 26 according to the fourth embodiment provides the same effects as those of the key sheet 22 according to the third embodiment. Further, it provides the following effect:

(1) In the key sheet 26, the fixation layer 29 extends over three "depressing operation portions," so that it is possible to illuminate three "depressing operation portions" with one fixation layer 29, using the fixation layer 29 as the light guide layer.

Fifth Embodiment

Figure 21:
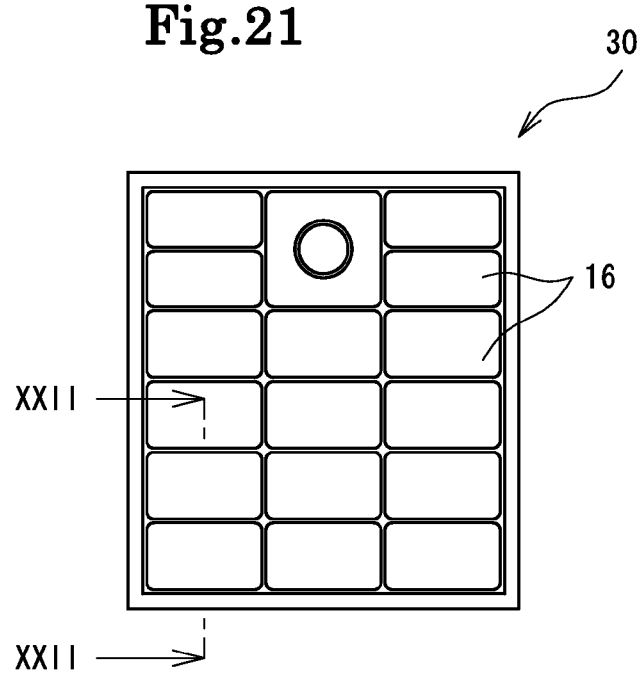
FIG. 21 is a plan view of a key sheet according to a fifth embodiment.
Figure 22:
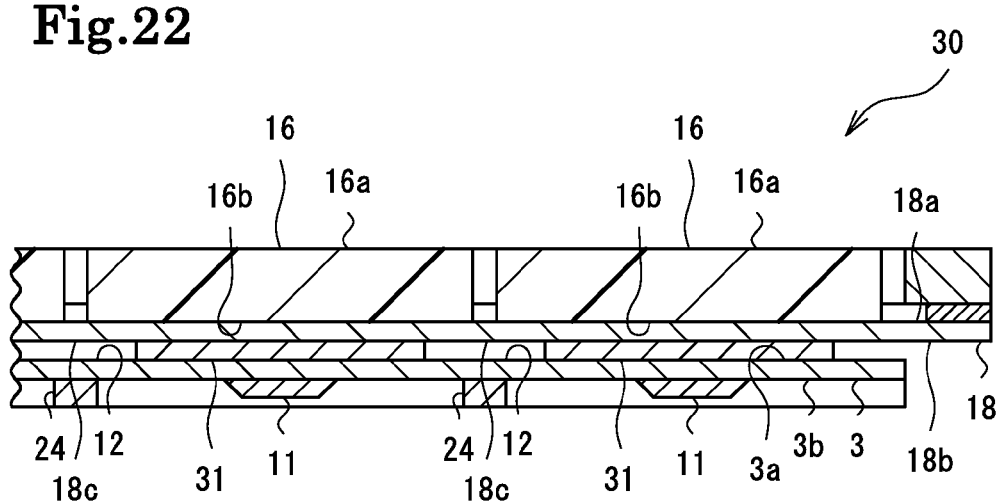
FIG. 22 is a sectional view taken along the line XXII-XXII of FIG. 21.
Figure 23:
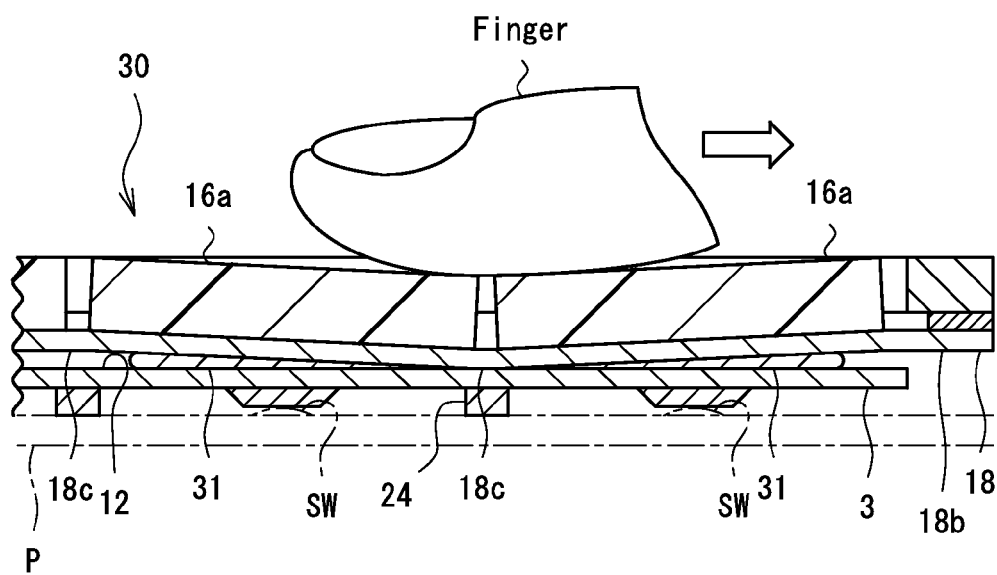
FIG. 23 is an explanatory view illustrating how sliding input operation is performed on the key sheet of the fifth embodiment.

FIGS. 21 through 23

FIGS. 21 through 23 illustrate a key sheet 30 according to the fifth embodiment. FIG. 21 is a plan view of the key sheet 30, FIG. 22 is a sectional view of the key sheet 30 taken along the line XXII-XXII, and FIG. 23 is an explanatory view illustrating how sliding input operation is performed on the key sheet 30. The key sheet 30 according to the fifth embodiment differs from the key sheet 22 according to the fourth embodiment in the construction in which the key tops 16 are arranged at small intervals and the decoration member 23 is eliminated, and the property of the fixation layers 31. Otherwise, it is of the same construction as the key sheet 22.

Description of the member construction; In the base sheet 18 according to this embodiment, the non-fixation portions of the key tops 16 serve as the movable contact portions 18c.

The fixation layer 31 is a "soft material layer" formed by a soft material capable of compressive deformation.

Description of the manufacturing method; Next, an example of the method of manufacturing the key sheet 30 of the fifth embodiment is described.

First, the key tops 16 are formed by injection molding, with display portions being provided on the top surfaces 16a or the bottom surfaces 16b thereof. The key tops 16 are inserted into the mold for the base sheet 18, and are fixed to the base sheet 18 simultaneously with the molding thereof. After that, the fixation layers 31 are formed by screen printing at the positions of the back surface 18b of the base sheet 18 corresponding to the key tops 16. Apart from this, the sensor sheet 3 is obtained through screen printing of the electrodes 7, 8, the resist layer 9, etc. on the base material sheet 6. After that, the molding pusher portions 11 are integrally fixed to the back surface 3b of the sensor sheet 3. Further, the leg portions 24 separately formed by injection molding are fixed by adhesive. Finally, the fixation layers 31 formed on the base sheet 18 and the front surface 3a of the sensor sheet 3 are fixed to each other, whereby the key sheet 30 is obtained.

Description of the input operation; Next, the input operation performed on the key sheet 30 according to the fifth embodiment is described.

The key sheet 30 allows both depressing input operation in which the key tops 16 are depressed and sliding input operation in which input is effected by stroking the top surface 16a of the key tops 16. In depressing input operation, when the key tops 16 are depressed, the fixation layer 31 and the sensor sheet 3 are depressed, and the molding pusher portions 11 provided on the back surface 3b of the sensor sheet 3 depress the contact switches SW to effect input.

In sliding input operation, when the top surfaces 16a of the key tops 16 are stroked by a finger, the movement path of the finger is sensed by the sensor sheet 3 from a change in capacitance value, and is detected and input as a coordinate position. When the finger passes between the key tops 16, there exists the gap 12 below the finger; the fixation layer 31 softly undergoes compressive deformation as the movable contact portion 18c of the base sheet 18 is displaced through depression by the finger at the time of sliding input operation, and the movable contact portion 18c of the base sheet 18 enters the gap 12 to eliminate the gap 12 (FIG. 23).

Description of the effects; The key sheet 30 according to the fifth embodiment provides the same effects as those of the key sheet 22 according to the third embodiment. Further, it provides the following effects:

(1) In the key sheet 30, even when the key tops 16 are arranged at small intervals, it is possible to realize satisfactory depressing operation input and reliable sliding operation input.

(2) The fixation layer 31 is formed as a soft material layer which can undergo compressive deformation as the movable contact portion 18c of the base sheet 18 is displaced through sliding input operation, and hence the layer end portion of the fixation layer 31 does not become stiff as the movable contact portion 18c is displaced but can softly undergo compressive deformation, making it possible to reduce the operational force for the sliding input operation requisite for displacing the movable contact portion 18c to bring it into contact with the sensor sheet 3.

First Modification of the Fifth Embodiment

Figure 24:
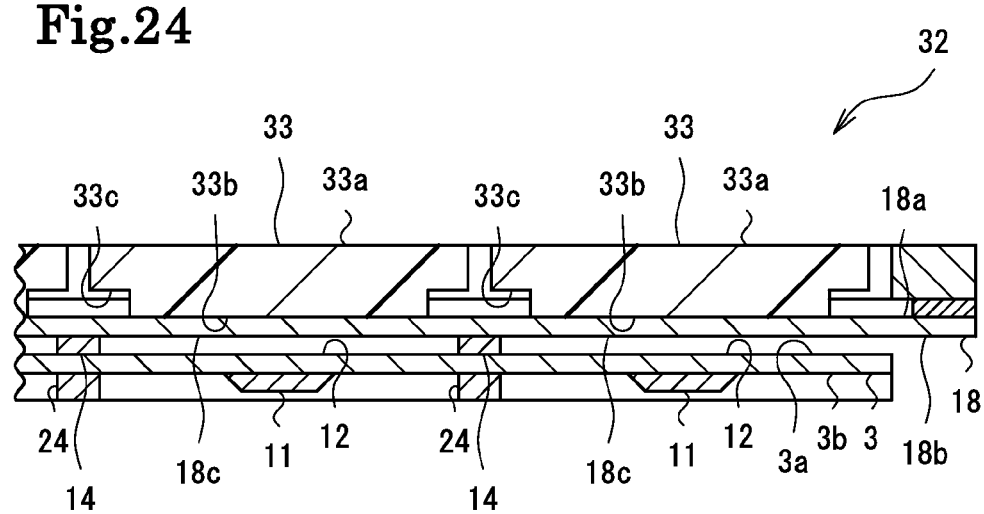
FIG. 24 is a sectional view, corresponding to FIG. 22, of a first modification of the key sheet of the fifth embodiment.
Figure 25:
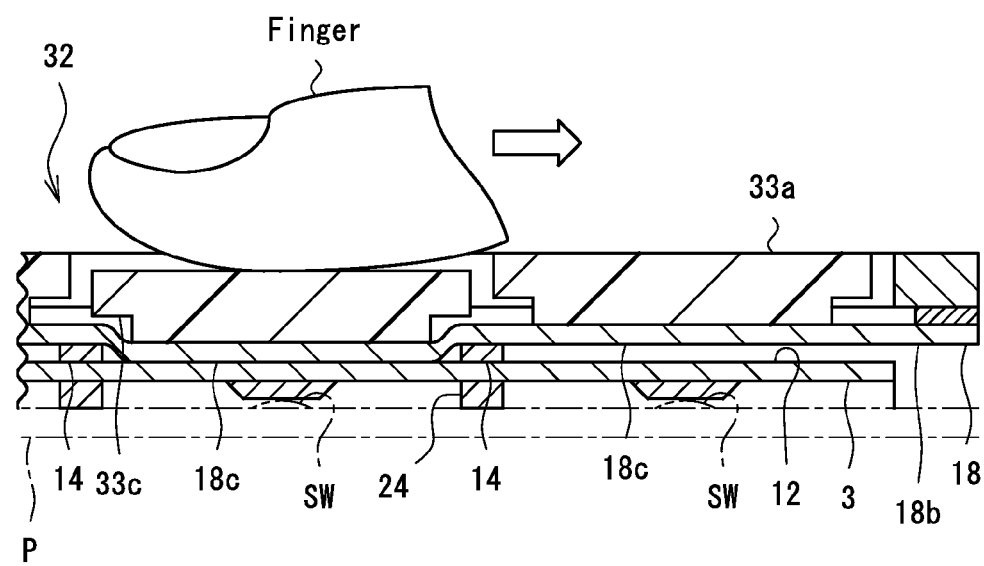
FIG. 25 is an explanatory view illustrating how sliding input operation is performed on the first modification of the key sheet of the fifth embodiment.

FIGS. 24 and 25

FIGS. 24 and 25 illustrate a key sheet according to a first modification. FIG. 24 is a sectional view of a key sheet 32, and FIG. 25 is an explanatory view illustrating how sliding input operation is performed on the key sheet 32. While in the key sheet 30 according to the fifth embodiment the fixation layer 31 is provided below the key tops 16, and the movable contact portions 18c are provided at the adjacent positions between the key tops 16 on the base sheet 18, in the key sheet 32 of the first modification, cutout-like step portions 33c are formed in the outer periphery of the bottom surfaces 33b of key tops 33, and fixation layers 14 are provided below the interval portions between the adjacent key tops 33, with the fixation surface portions 18c for the key tops 33 of the base sheet 18 being used as the "movable contact portions."

In this construction, the fixation layers 14 are formed in the portions below the portions between the adjacent key tops 33, and there are no fixation layers 14 below the key tops 33 but the gaps 12 are formed, and hence it is possible to suppress the depression load to a low level. Further, when the contact switches SW with click feel are depressed, the click feel can be easily transmitted, making it possible to realize a depressing operation input of satisfactory depression operability through clear click feel.

Further, as illustrated in FIG. 25, the fixation surface portions 18c for the key tops 16 for the base sheet 18 are used as the "movable contact portions," so that it is possible to eliminate the gaps 12 during sliding input operation, making it possible to sense in a stable manner the capacitance at an in-plane position of the sliding operation surface of the sensor sheet 3. Thus, it is possible to realize reliable sliding operation input through accurate coordinate position detection. Further, also in the outer periphery of the key tops arranged at small intervals, the step portions 33c are brought into contact with the base sheet 18, thus forming a laminate structure devoid of the gaps 12. Thus, it is possible to sense capacitance with high sensitivity.

Second Modification of the Fifth Embodiment

Figure 26:
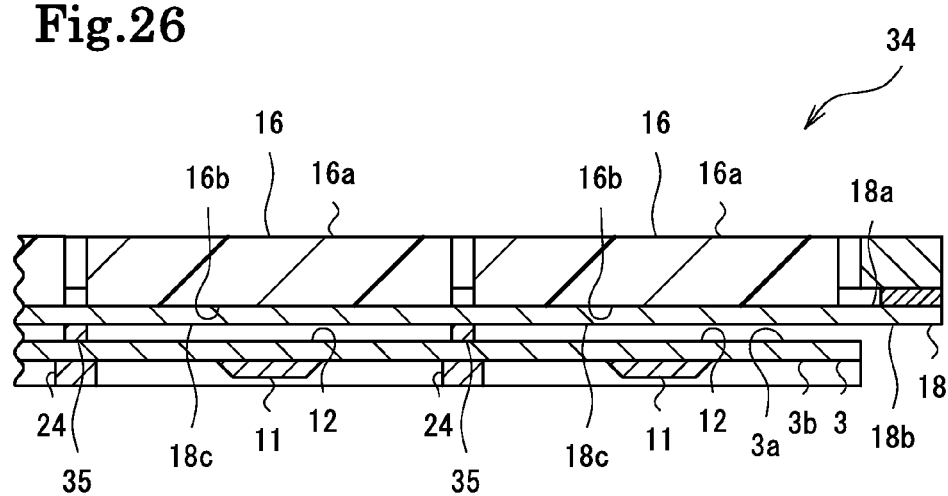
FIG. 26 is a sectional view, corresponding to FIG. 22, of a second modification of the key sheet of the fifth embodiment.
Figure 27:
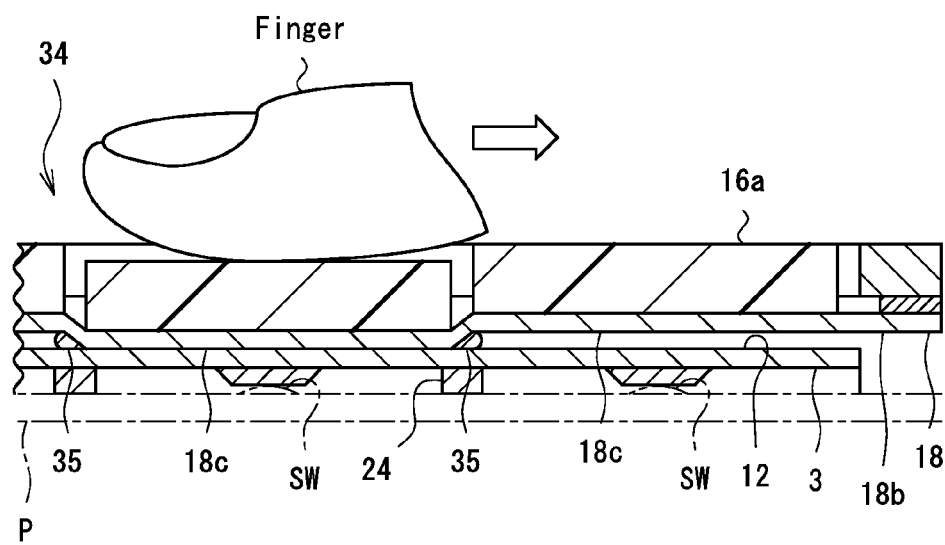
FIG. 27 is an explanatory view illustrating how sliding input operation is performed on the second modification of the key sheet of the fifth embodiment.

FIGS. 26 and 27

FIGS. 26 and 27 illustrate a key sheet 34 according to a second modification. FIG. 26 is a sectional view of a key sheet 34, and FIG. 27 is an explanatory view illustrating how sliding input operation is performed on the key sheet 34. While in the key sheet 30 according to the fifth embodiment the fixation layer 31 is provided below the key tops 16, and the movable contact portions 18c are provided at the adjacent positions between the key tops 16 on the base sheet 18, in the key sheet 34 of the first modification, light guiding fixation layers 35 are provided below the interval portions between the adjacent key tops 16, with the fixation surface portions 18c for the key tops 16 of the base sheet 18 being used as the "movable contact portions".

In this construction, the fixation layers 35 are formed in the portions below the portions between the adjacent key tops 16, and there are no fixation layers 35 below the key tops 16 but the gaps 12 are formed, and hence it is possible to suppress the depression load to a low level. Further, when the contact switches SW with click feel are depressed, the click feel can be easily transmitted, making it possible to realize a depressing operation input of satisfactory depression operability through clear click feel.

Further, as illustrated in FIG. 27, the fixation surface portions 18c for the key tops 16 for the base sheet 18 are used as the "movable contact portions," so that it is possible to eliminate the gaps 12 during sliding input operation, making it possible to sense in a stable manner the capacitance at an in-plane position of the sliding operation surface of the sensor sheet 3. Thus, it is possible to realize reliable sliding operation input through accurate coordinate position detection. Further, the fixation layers 35 are soft material layers that can undergo compressive deformation as the movable contact portions 18c of the base sheet 18 are displaced through sliding input operation, and hence the layer end portions of the fixation layers 35 do not become stiff but can softly undergo compressive deformation as the movable contact portions 18c are displaced, making it possible to reduce the operational force for sliding input operation requisite for displacing the movable contact portions 18c to bring them into contact with the sensor sheet 3.

What is claimed is:

1. A key sheet, which comprises:
   an operation member having a plurality of depressing operation portions on a sliding operation surface on which a user performs sliding input operation; and
   a sensor sheet for sensing the sliding input operation of the user as a change in capacitance,
   further comprising a fixation layer provided below the plurality of depressing operation portions and existing between the operation member and the sensor sheet to form a laminate structure devoid of a gap in a direction perpendicular to a plane of the sliding operation surface,
   wherein the operation member has, at adjacent positions between the plurality of depressing operation portions, a movable contact portion which enters a gap devoid of a fixation layer between the operation member and the sensor sheet through sliding operation of the user and which is displaced so as to be capable of coming into contact with the sensor sheet.

2. A key sheet according to claim 1,
   wherein the operation member is provided with
   key tops as the plurality of depressing operation portions and
   a flexible base sheet for supporting the key tops so as to allow depression displacement in the direction perpendicular to the plane, and
   wherein the movable contact portion of the operation member is a non-fixation portion for the key tops of the base sheet.

3. A key sheet according to claim 1,
   wherein the operation member is provided with
   key tops as the plurality of depressing operation portions arranged adjacent to each other at small intervals and
   a flexible base sheet for supporting the key tops so as to allow depression displacement in the direction perpendicular to the plane,
   wherein the movable contact portion of the operation member is a non-fixation portion for the key tops of the base sheet, and
   wherein the non-fixation portion enters the gap upon depression of an outer periphery of the key tops at a time of sliding input operation by the user and is displaced so as to be capable of coming into contact with the sensor sheet.

4. A key sheet according to claim 1,
   wherein the operation member is provided with
   key tops as the plurality of depressing operation portions, a flexible base sheet for supporting the key tops so as to allow depression displacement in the direction perpendicular to the plane, and a decoration member fixed to the base sheet so as to divide the key tops from each other, wherein the movable contact portion of the operation member is a fixation surface portion for the decoration member of the base sheet, and wherein the fixation surface portion enters the gap upon depression of the decoration member at a time of sliding input operation by the user and is displaced so as to be capable of coming into contact with the sensor sheet.

5. A key sheet according to claim 4, wherein a top surface of the decoration member protrudes beyond top surfaces of the key tops.

6. A key sheet according to claim 1, wherein the operation member is provided with a flexible film key sheet having display portions exhibiting characters, numbers, or the like for input operation as the plurality of depressing operation portions, wherein the movable contact portion of the operation member is an adjacent portion between the display portions of the film key sheet, and wherein the adjacent portion enters the gap upon depression at a time of sliding input operation by the user and is displaced so as to be capable of coming into contact with the sensor sheet.

7. A key sheet, which comprises:

an operation member having a plurality of depressing operation portions on a sliding operation surface on which a user performs sliding input operation;

a sensor sheet for sensing the sliding input operation of the user as a change in capacitance, the sensor sheet including
 a base material,
 a first electrode on one side of the base material, and
 a second electrode on an other side opposite to the one side of the base material; and a fixation layer provided below the plurality of adjacent depressing operation portions and existing between the operation member and the sensor sheet to form a laminate structure devoid of a gap in a direction perpendicular to a plane of the sliding operation surface, wherein the operation member has, at positions corresponding to the plurality of depressing operation portions, a movable contact portion which enters a gap devoid of the fixation layer between the operation member and the sensor sheet through sliding operation of the user and which is displaced so as to be capable of coming into contact with the sensor sheet.

8. A key sheet according to claim 7, wherein the operation member is provided with
 key tops as the plurality of depressing operation portions and
 a flexible base sheet for supporting the key tops so as to allow depression displacement in the direction perpendicular to the plane, and wherein the movable contact portion of the operation member is a fixation surface portion for the key tops of the base sheet.

9. A key sheet according to claim 7, wherein the operation member is provided with key tops as the plurality of depressing operation portions arranged adjacent to each other at small intervals and a flexible base sheet for supporting the key tops so as to allow depression displacement in the direction perpendicular to the plane, wherein the movable contact portion of the operation member is a fixation surface portion for the key tops of the base sheet, and wherein the fixation surface portion enters the gap devoid of the fixation layers between the operation member and the sensor sheet through sliding input operation by the user and is displaced so as to be capable of coming into contact with the sensor sheet.

10. A key sheet according to claim 9, wherein cutout-like step portions are provided in an outer periphery of bottom surfaces of the key tops, and wherein the step portions are displaced so as to be capable of coming into contact with the adjacent portions between the key tops of the base sheet in accordance with the displacement of the fixation surface portion of the base sheet due to sliding input operation by the user, forming a part of the laminate structure.

11. A key sheet according to claim 7, wherein the operation member is provided with key tops as the plurality of depressing operation portions,
 a flexible base sheet for supporting the key tops so as to allow depression displacement in the direction perpendicular to the plane, and
 a decoration member fixed to the base sheet so as to divide the key tops from each other to form a part of the laminate structure, wherein the movable contact portion of the operation member is a fixation surface portion for the key tops of the base sheet, and wherein the fixation surface portion enters the gap devoid of the fixation layers between the operation member and the sensor sheet through sliding input operation by the user and is displaced so as to be capable of coming into contact with the sensor sheet.

12. A key sheet according to claim 7, wherein the operation member is provided with a flexible film key sheet having display portions exhibiting characters, numbers, or the like for input operation as the plurality of depressing operation portions, wherein the movable contact portion of the operation member is the display portions of the film key sheet, and wherein the display portion enters the gap upon depression at a time of sliding input operation by the user and is displaced so as to be capable of coming into contact with the sensor sheet.

13. A key sheet according to claim 1, wherein the fixation layer is a soft material layer capable of compressive deformation in accordance with the displacement of the movable contact portion of the operation member through sliding input operation by the user.

14. A key sheet according to claim 1, wherein the operation member comprises an illumination type operation member through which light from an inner light source is transmitted, and wherein the fixation layer comprises one of an adhesive layer and an adhesion material layer, which have light guiding property allowing light from the inner light source to be guided.

15. A key sheet according to claim 1, wherein the operation member comprises an illumination type operation member through which light from an inner light source is transmitted, and wherein the sensor sheet has
 a light transmitting base material sheet through which light from the inner light source is transmitted, and a light transmitting printed-circuit layer formed of a light transmitting conductive coating material on the base material sheet.

16. A key sheet according to claim 1,
wherein the operation member comprises an illumination type operation member through which light from an inner light source is transmitted,
wherein the sensor sheet is provided with a light transmitting base material sheet through which light from the inner light source is transmitted, and
wherein a capacitance sensing circuit layer formed by alternately stacking together a printed-circuit layer and an insulating layer on a back surface of the base material sheet whose front surface faces the operation member.

17. A key sheet according to claim 1, wherein, at positions on a back surface of the sensor sheet corresponding to the plurality of depressing operation portions, there are provided molding pusher portions integrally fixed to the back surface through molding.

\* \* \* \* \*